United States Patent
Yata et al.

(10) Patent No.: US 10,317,725 B2
(45) Date of Patent: Jun. 11, 2019

(54) DISPLAY DEVICE

(71) Applicant: Japan Display Inc., Tokyo (JP)

(72) Inventors: Tatsuya Yata, Tokyo (JP); Kazunari Tomizawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/992,819

(22) Filed: May 30, 2018

(65) Prior Publication Data

US 2018/0348573 A1    Dec. 6, 2018

(30) Foreign Application Priority Data

Jun. 2, 2017 (JP) .................................. 2017-110050
Mar. 20, 2018 (JP) .................................. 2018-053014

(51) Int. Cl.
| | |
|---|---|
| *G02F 1/1335* | (2006.01) |
| *G09G 3/36* | (2006.01) |
| *G02F 1/1343* | (2006.01) |
| *G02F 1/133* | (2006.01) |

(52) U.S. Cl.
CPC .... *G02F 1/133553* (2013.01); *G02F 1/13306* (2013.01); *G02F 1/133512* (2013.01); *G02F 1/133514* (2013.01); *G02F 1/134309* (2013.01); *G09G 3/36* (2013.01)

(58) Field of Classification Search
CPC .............................. G02F 1/1333; G02F 1/1339
See application file for complete search history.

(56) References Cited

U.S. PATENT DOCUMENTS

| | | |
|---|---|---|
| 2009/0135213 A1 | 5/2009 | Tomizawa et al. |
| 2012/0229529 A1 | 9/2012 | Tomizawa et al. |

FOREIGN PATENT DOCUMENTS

| | | |
|---|---|---|
| JP | 4364281 B2 | 8/2009 |
| JP | 2010-097176 A | 4/2010 |
| JP | 5427246 B2 | 12/2013 |

*Primary Examiner* — Phu Vu
(74) *Attorney, Agent, or Firm* — Michael Best & Friedrich LLP

(57) ABSTRACT

According to an aspect, a display device includes: a controller; and a pixel including: first to fourth sub-pixels including respective first to fourth color filters transmitting light having respective spectrum peaks falling on a spectrum of reddish green, a spectrum of bluish green, a spectrum of red, and a spectrum of blue, respectively. The first to fourth sub-pixels each include a reflective electrode reflecting light transmitted through the color filter. The first to fourth sub-pixels are each divided into sub-divided pixels having different areas to perform multiple gradation expression through a combination of whether each of the sub-divided pixels reflects light. The controller stores patterns of combinations of whether each of the sub-divided pixels reflects light according to an input signal, and controls operations of the sub-divided pixels through use of any one of the patterns based on a predetermined condition including light intensity.

14 Claims, 19 Drawing Sheets

| REPRODUCED COLOR | WHITE | RED | GREEN | BLUE | YELLOW | CYAN | MAGENTA |
|---|---|---|---|---|---|---|---|
| INPUT (R, G, B) | (n, n, n) | (n, 0, 0) | (0, n, 0) | (0, 0, n) | (m, m, 0) | (0, m, m) | (m, 0, m) |
| OUTPUT (R1, RG1, BG1, B1) | (n1, n2, n3, n4) | (n, 0, 0, 0) | (0, n5, n6, 0) | (0, 0, 0, n) | (m1, m2, m3, 0) | (0, m4, m5, m6) | (m7, 0, 0, m8) |

FIG.4

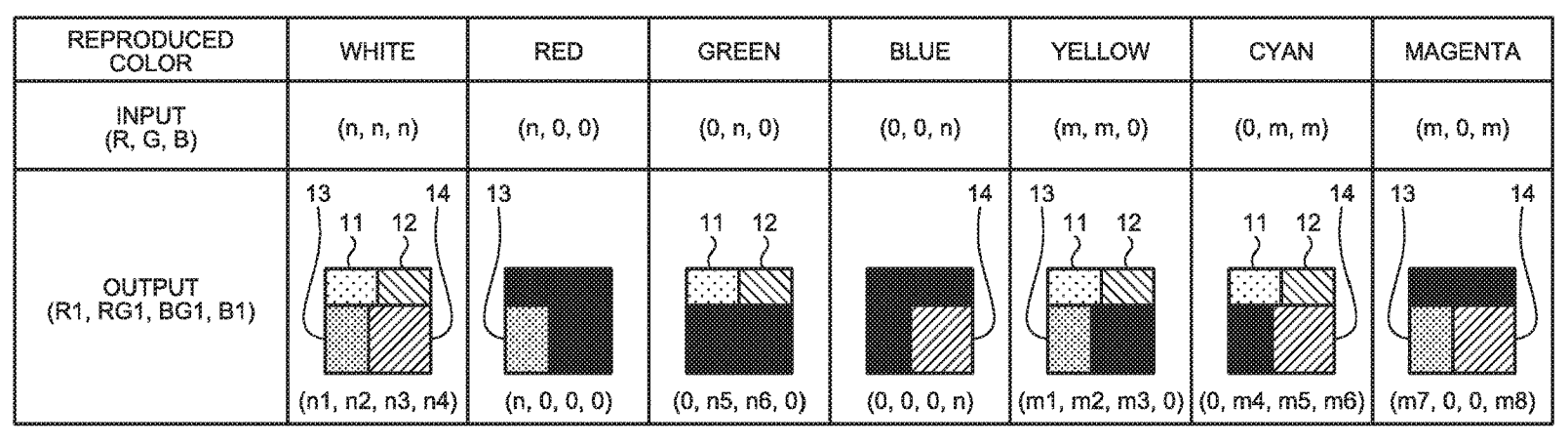

| REPRODUCED COLOR | WHITE | RED | GREEN | BLUE | YELLOW | CYAN | MAGENTA |
|---|---|---|---|---|---|---|---|
| INPUT (R, G, B) | (n, n, n) | (n, 0, 0) | (0, n, 0) | (0, 0, n) | (m, m, 0) | (0, m, m) | (m, 0, m) |
| OUTPUT (R1, RG1, BG1, B1) | (n1, n2, n3, n4) | (n, 0, 0, 0) | (0, n5, n6, 0) | (0, 0, 0, n) | (m1, m2, m3, 0) | (0, m4, m5, m6) | (m7, 0, 0, m8) |

DISPLAY DEVICE

CROSS-REFERENCE TO RELATED APPLICATIONS

This application claims priority from Japanese Application No. 2017-110050, filed on Jun. 2, 2017, and Japanese Application No. 2018-053014, filed on Mar. 20, 2018, the contents of which are incorporated by reference herein in its entirety.

BACKGROUND

1. Technical Field

The present disclosure relates to a display device.

2. Description of the Related Art

As disclosed in Japanese Patent Application Laid-open Publication No. 2010-97176, a reflective display device that reflects external light to display a color image has been known.

The reflective display device typically combines light reflected from sub-pixels of red (R), green (G), and blue (B) to output light having a color other than the foregoing colors. However, yellow obtained by combining reflected light in red (R) and green (G) looks dingy, and obtaining required luminance and saturation has been a difficult task to achieve.

For the foregoing reasons, there is a need for a display device that can enhance the luminance and saturation of yellow.

SUMMARY

According to an aspect, a display device includes: a controller; and a pixel including: a first sub-pixel including a first color filter configured to transmit light having a spectrum peak falling on a spectrum of reddish green; a second sub-pixel including a second color filter configured to transmit light having a spectrum peak falling on a spectrum of bluish green; a third sub-pixel including a third color filter configured to transmit light, having a spectrum peak falling on a spectrum of red; and a fourth sub-pixel including a fourth color filter configured to transmit light having a spectrum peak falling on a spectrum of blue. The first sub-pixel, the second sub-pixel, the third sub-pixel, and the fourth sub-pixel each include a reflective electrode configured to reflect light transmitted through the corresponding color filter. Each of the third sub-pixel and the fourth sub-pixel is greater in size than the first sub-pixel and the second sub-pixel. The first sub-pixel added to the second sub-pixel has a size equal to or greater than a size of the third sub-pixel. The first sub-pixel, the second sub-pixel, the third sub-pixel, and the fourth sub-pixel are each divided into a plurality of sub-divided pixels having different areas so as to perform multiple gradation expression through a combination of whether each of the sub-divided pixels reflects light. The controller is configured to store a plurality of patterns of combinations of whether each of the sub-divided pixels reflects light according to an input signal, and control operations of the sub-divided pixels through use of any one of the patterns based on a predetermined condition including intensity of the light.

BRIEF DESCRIPTION OF THE DRAWINGS

FIG. 4 is a chart indicating relations among reproduced colors by a single pixel, R, G, and B gradation values applied as image signals, and the sub-pixels used for the output;

FIG. 14 is a diagram illustrating an example of area coverage modulation including a plurality of patterns;

FIG. 17 is a diagram illustrating another example of area coverage modulation including a plurality of patterns;

DETAILED DESCRIPTION

Figure 1:
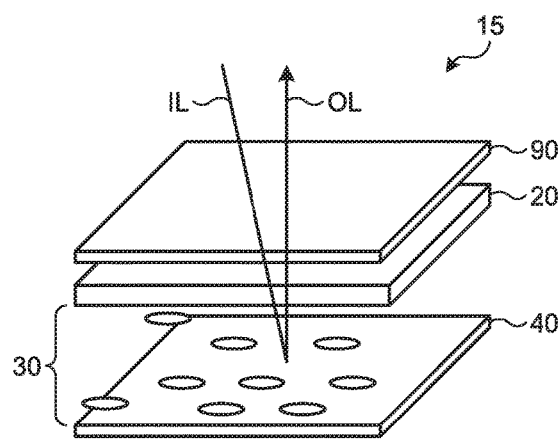
FIG. 1 is a perspective view schematically illustrating a major configuration of a single sub-pixel.

Modes (embodiments) for carrying out the present disclosure will be described below in detail with reference to the drawings. The disclosure is given by way of example only, and various changes made without departing from the spirit of the disclosure and easily conceivable by those skilled in the art naturally fall within the scope of the present disclosure. The drawings may possibly illustrate the width, the thickness, the shape, and other elements of each unit more schematically than the actual aspect to simplify the explanation. These elements, however, are given by way of example only and are not intended to limit interpretation of the present disclosure. In the specification and the drawings, components similar to those previously described with reference to a preceding drawing are denoted by like reference numerals, and overlapping explanation thereof will be appropriately omitted. In this disclosure, when an element A is described as being "on" another element B, the element A can be directly on the other element B, or there can be one or more elements between the element A and the other element B.

Figure 2:
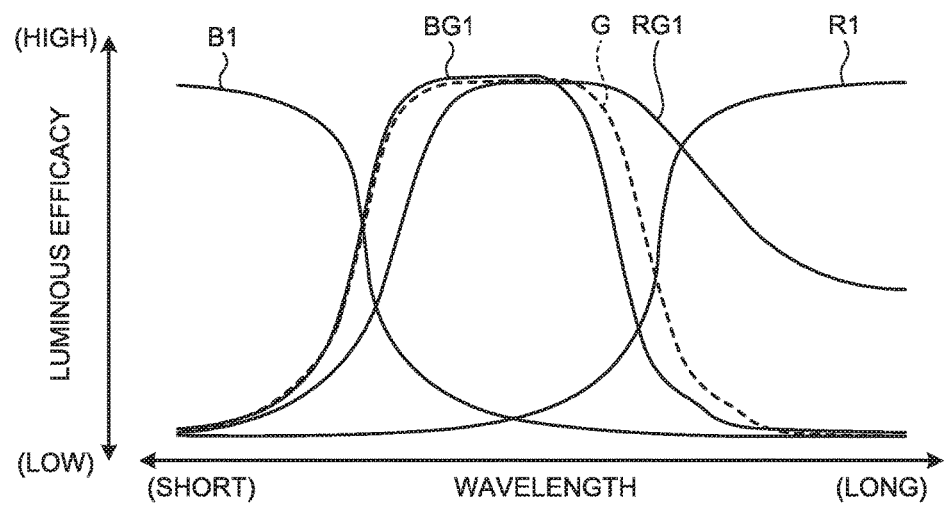
FIG. 2 is a graph indicating exemplary spectra of red, reddish green, green, bluish green, and blue.

FIG. 1 is a perspective view schematically illustrating a main configuration of a single sub-pixel 15. FIG. 2 is a graph indicating exemplary spectra of red, reddish green, green, bluish green, and blue. The sub-pixel 15 includes a color filter 20 and a reflective electrode 40. The color filter 20 has light transmissivity, The color filter 20 has a predetermined peak of a spectrum of light OL to be transmitted out of external light IL. Specifically, the peak of the spectrum of the light OL to be transmitted through the color filter 20 falls on either one of the spectrum of reddish green (e.g., first red green RG1), the spectrum of bluish green (e.g., first blue green BG1), the spectrum of red (e.g., red R1), and the spectrum of blue (e.g., blue B1). The reflective electrode 40 reflects the light OL that is transmitted through the color filter 20. As exemplified in FIG. 2, the peak of the spectrum of the first red green RG1 and the peak of the spectrum of the first blue green BG1 each have a portion overlapping with the peak of the spectrum of light viewed as green G. The spectrum of the first red green RG1 is closer to the spectrum of the red R1 (on the long wavelength side) than the spectrum of the first blue green BG1 and the spectrum of the green G are. The spectrum of the first blue green BG1 is closer to the spectrum of the blue B1 (on the short wavelength side) than the spectrum of the first red green RG1 and the spectrum of the green G are.

A liquid crystal layer 30 is disposed between the color filter 20 and the reflective electrode 40. The liquid crystal layer 30 includes liquid crystal molecules having an orientation determined according to a voltage applied thereto by the reflective electrode 40, for example. The liquid crystal molecule varies a degree of transmission of the light OL that passes between the color filter 20 and the reflective electrode 40 according to the orientation. A light modulation layer 90 may be disposed on the opposite side of the liquid crystal layer 30 with the color filter 20 interposed therebetween. The light modulation layer 90 modulates, for example, a scattering direction of the light OL emitted from the liquid crystal layer 30 by the display device.

Figure 3:
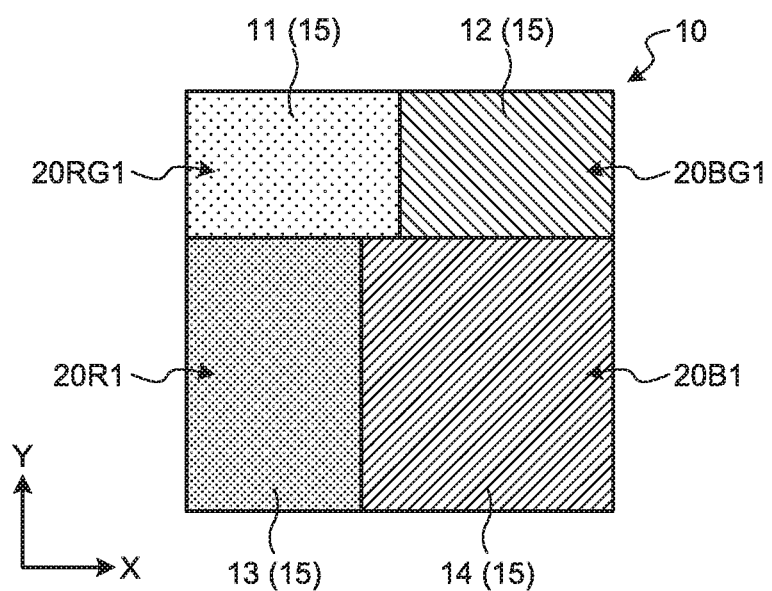
FIG. 3 is a diagram illustrating exemplary shapes and sizes of sub-pixels included in a single pixel, an exemplary positional relation among the sub-pixels, and exemplary color filters of the respective sub-pixels.

FIG. 3 is a diagram illustrating exemplary shapes and sizes of the sub-pixels 15 included in a single pixel 10, an exemplary positional relation among the sub-pixels 15, and exemplary color filters 20 of the respective sub-pixels 15.

The pixel 10 includes a first sub-pixel 11, a second sub-pixel 12, a third sub-pixel 13, and a fourth sub-pixel 14. The first sub-pixel 11 includes a first color filter 20RG1. The second sub-pixel 12 includes a second color filter 20BG1. The third sub-pixel 13 includes a third color filter 20R1. The fourth sub-pixel 14 includes a fourth color filter 20B1. The peak of the spectrum of the light transmitted through the first color filter 20RG1 falls on the spectrum of the reddish green (first red green RG1). The peak of the spectrum of the light transmitted through the second color filter 20BG1 falls on the spectrum of the bluish green (first, blue green BG1). The peak of the spectrum of the light transmitted through the third color filter 20R1 falls on the spectrum of the red (red R1). The peak of the spectrum of the light transmitted through the fourth color filter 20B1 falls on the spectrum of the blue (blue B1). The pixel has a square shape in a plan view, and includes the sub-pixels in the respective four colors in respective regions obtained by sectioning the square pixel region. The sub-pixels each have a square or rectangular shape in a plan view (hereinafter referred to as a rectangle). The four rectangles are combined to form the square pixel. A light shielding layer such as a black matrix may be disposed in regions between the sub-pixels and an outer edge of the pixel, but this light shielding layer occupies only a small area of the pixel. Thus, when describing the shapes or combination of the sub-pixels or the shape of the pixel, such a light shielding layer may be substantially disregarded as a linear object constituting an outer edge of the pixel or the sub-pixel.

In the following description, the term "color filter 20" will be used to describe the color filter 20 when the peak of the spectrum of the light OL to be transmitted is not differentiated. When the peak of the spectrum of the light OL to be transmitted is differentiated, the color filter 20 will be described as, for example, the first color filter 20RG1, the second color filter 20BG1, the third color filter 20R1, or the fourth color filter 20B1, where appropriate. The light OL that has been transmitted through the color filter 20 is viewed as light in the color corresponding to the peak of the spectrum of the light to be transmitted through the color filter 20. The term "sub-pixel 15" will be used when the sub-pixel 15 is not differentiated among the first sub-pixel 11, the second sub-pixel 12, the third sub-pixel 13, and the fourth sub-pixel 14, for example, by the colors of the color filters 20 included in the respective sub-pixels 15. The first sub-pixel 11, the second sub-pixel 12, the third sub-pixel 13, and the fourth sub-pixel 14 each include the reflective electrode 40 as illustrated in FIG. 1, which is omitted in FIG. 3.

The third sub-pixel 13 and the fourth sub-pixel 14 are each greater in size than the first sub-pixel 11 and the second sub-pixel 12. The first sub-pixel 11 added to the second sub-pixel 12 has a size equal to or greater than a size of the third sub-pixel 13. The fourth sub-pixel 14 is greater in size than the third sub-pixel 13. The first sub-pixel 11 is identical in size to the second sub-pixel 12. When an area ratio of the first sub-pixel 11, the second sub-pixel 12, the third sub-pixel 13, and the fourth sub-pixel 14 is expressed as A to B to C to D, the following expressions hold: $0.65 \leq A=B<1.0$, $1.0 \leq C<D$, $D=4-(A+B+C)$, and $D \leq 1.7$. FIG. 3 exemplifies a case in which the expression of A to B to C to D=0.744 to 0.744 to 1.130 to 1.382 holds. In this case, the first sub-pixel 11 added to the second sub-pixel 12 has a size equal to or greater than a size of the third sub-pixel 13 and has a size equal to or greater than a size of the fourth sub-pixel 14. In the embodiment, the first sub-pixel shares part of a side with the fourth sub-pixel. In contrast, the second sub-pixel and the third sub-pixel share no side. More specifically, a side shared between the first sub-pixel and the second sub-pixel coincides with an intermediate line dividing the pixel laterally into half. In contrast, a side shared between the third sub-pixel and the fourth sub-pixel is shifted toward the first sub-pixel with respect to the intermediate line. As a result, the first sub-pixel and the fourth sub-pixel share part of the side.

FIG. 4 is a chart indicating relations among reproduced colors by a single pixel 10, R, G, and B gradation values applied as image signals, and the sub-pixels 15 used for the output. When the input gradation values of R, G, and B are expressed as (R, G, B)=(n, n, n), the reproduced color is white and the first sub-pixel 11, the second sub-pixel 12, the third sub-pixel 13, and the fourth sub-pixel 14 are used for the output. When the input gradation values of R, G, and B are expressed as (R, G, B)=(n, 0, 0), the reproduced color is red and the third sub-pixel 13 is used for the output. When the input gradation values of R, G, and B are expressed as (R, G, B)=(0, n, 0), the reproduced color is green and the first sub-pixel 11 and the second sub-pixel 12 are used for the output. When the input gradation values of R, G, and B are expressed as (R, G, B)=(0, 0, n), the reproduced color is blue and the fourth sub-pixel 14 is used for the output. When the input gradation values of R, G, and B are expressed as (R, G, B)=(m, m, 0), the reproduced color is yellow and the first sub-pixel 11, the second sub-pixel 12, and the third sub-pixel 13 are used for the output. When the input gradation values of R, G, and B are expressed as (R, G, B)=(0, m, m), the reproduced color is cyan and the first sub-pixel 11, the second sub-pixel 12, and the fourth sub-pixel 14 are used for the output. When the input gradation values of R, G, and B are expressed as (R, G, B)=(m, 0, m), the reproduced color is magenta and the third sub-pixel 13 and the fourth sub-pixel 14 are used for the output. In this manner, the display device in the embodiment reproduces yellow through the combination of the first sub-pixel 11, the second sub-pixel 12, and the third sub-pixel 13. The display device in the embodiment reproduces green through the combination of the first sub-pixel 11 and the second sub-pixel 12. The display device in the embodiment reproduces cyan through the combination of the first sub-pixel 11, the second sub-pixel 12, and the fourth sub-pixel 14. The display device in the embodiment reproduces magenta through the combination of the third sub-pixel 13 and the fourth sub-pixel 14. The display device in the embodiment reproduces red using the third sub-pixel 13. The display device in the embodiment reproduces blue using the fourth sub-pixel 14.

Figure 5:
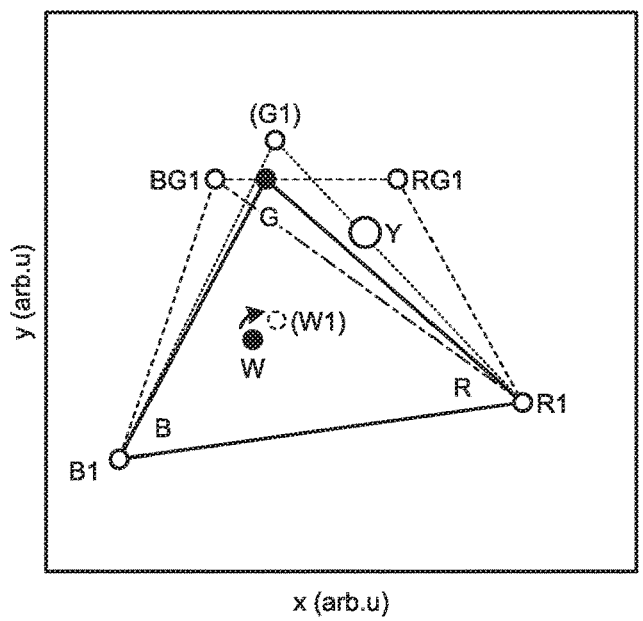
FIG. 5 is a chart indicating a schematic chromaticity diagram that represents a correspondence between yellow reproduced by a display device in an embodiment and the peaks of spectra of light transmitted through the color filter.

FIG. 5 is a chart indicating a schematic chromaticity diagram (xy chromaticity diagram) that represents a correspondence between yellow reproduced by the display device in the embodiment and the peaks of the spectra of the light OL transmitted through the color filter 20, the chromaticity diagram being plotted within chromaticity coordinates (xy chromaticity coordinates). The chromaticity diagram indicates yellow Y having predetermined luminance and saturation required for a display device. The chromaticity diagram further indicates a color space indicating colors that can be reproduced by sub-pixels of respective three colors of the conventional red (R), conventional green (G), and conventional blue (B) included in the conventional display device. The color space is indicated by the solid-line triangle having three vertexes of R, G, and B in FIG. 5. As illustrated in FIG. 5, the yellow Y cannot be reproduced. Specifically, the luminance and saturation of yellow to be reproduced by the conventional display device are unable to exceed luminance and saturation on a straight line connecting the conventional red (R) and the conventional green (G) with respect to a white point (W). The conventional display device lacks in at least either one of luminance and saturation as a property of a display device, and thus the display device cannot reproduce the yellow Y located farther from the straight line with respect to the white point. Even when the conventional display device includes sub-pixels of four colors of white (W) added to the conventional red (R), the conventional green (G), and the conventional blue (B), increasing saturation of the yellow Y using the sub-pixel of white (W) is a difficult task to achieve.

Trying to reproduce the yellow Y using the sub-pixels of three colors by conventional technology requires the conventional red (R) and the conventional green (G) to be shifted to red (e.g., R1) and green (e.g., G1) that can reproduce the yellow Y. However, shifting the conventional red (R) and the conventional green (G) to the red (e.g., R1) and the green (e.g., G1) that can reproduce the yellow Y by simply targeting the reproduction of the yellow Y causes the white point (W) to be shifted toward the yellow Y. Specifically, setting the red (e.g., R1) and the green (e.g., G1) by targeting the reproduction of the yellow Y in the conventional display device causes a color reproduced by lighting all sub-pixels to be tinged with yellow as a whole, resulting in changing color reproducibility. FIG. 5 schematically indicates the white point (W) before being shifted toward the yellow Y using a black dot. FIG. 5 further indicates the white point after having been shifted toward the yellow Y using a blank dot outlined by the broken line and denoted as W1. Setting the red (e.g., R1) and the green (e.g., G1) by targeting the reproduction of the yellow Y means to further darken these colors, and reduce light transmission efficiency of the color filter 20 and luminance, resulting in dark yellow.

An approach is conceivable in which the yellow sub-pixel is added to the pixel of the conventional display device. This approach still causes the color reproduced by lighting all sub-pixels to be tinged with yellow as a whole, resulting in changing color reproducibility.

In the display device according to the embodiment, on the other hand, the first sub-pixel 11 includes the first color filter 20RG1 and the second sub-pixel 12 includes the second color filter 20BG1. The peak of the spectrum of the light transmitted through the first color filter 20RG1 falls on the spectrum of the reddish green (first red green RG1). The peak of the spectrum of the light transmitted through the second color filter 20BG1 falls on the spectrum of the bluish green (first blue green BG1). The peak of the spectrum of the light transmitted through the third color filter 20R1 falls on the spectrum of the red (red R1). The peak of the spectrum of the light transmitted through the fourth color filter 20B1 falls on the spectrum of the blue (blue B1). More specifically, by representing the peak of the spectrum of the light that passes through the first color filter on the chromaticity coordinates (RG1 in FIG. 5), the x-coordinate of the peak is between the x-coordinate of the white point and the x-coordinate of the red (R1 in FIG. 5) corresponding to the third color filter 20R1. Similarly, by representing the peak of the spectrum of the light that passes through the second color filter on the chromaticity coordinates (BG1 in FIG. 5), the x-coordinate of the peak is between the x-coordinate of the white point and the x-coordinate of the blue (B1 in FIG. 5) corresponding to the fourth color filter 20B1. Thus, the embodiment obtains a blue component through the second sub-pixel 12 and the fourth sub-pixel 14, thereby preventing the white point (W) from being shifted toward the yellow Y. The embodiment reproduces yellow through the combination of the first sub-pixel 11, the second sub-pixel 12, and the third sub-pixel 13. Specifically, the peaks of the spectra of light transmitted through the first color filter 20RG1, the second color filter 20BG1, and the third color filter 20R1, respectively, are set such that a combined color of the first red green RG1, the first blue green BG1, and the red R1 is the yellow Y. This configuration allows the yellow Y to be reproduced using the three sub-pixels 15 out of the four sub-pixels 15 of the single pixel 10. Thus, the embodiment allows the area of the sub-pixels 15 used for reproducing the yellow Y to be easily increased as compared with a case in which two colors (R and G) are used out of the sub-pixels of three colors of the conventional red (R), the conventional green (G), and the conventional blue (B). Specifically, the embodiment allows a wider area encompassing the first sub-pixel 11, the second sub-pixel 12, and the third sub-pixel 13 out of a display region of the single pixel 10 to be easily allocated to the reproduction of the yellow Y, thereby reliably achieving the luminance and the saturation of the yellow Y. Furthermore, the embodiment also enhances the luminance and the saturation of cyan. Additionally, the embodiment eliminates the need for including a sub-pixel corresponding to white (W) within the pixel area. As a result, the embodiment allows the third sub-pixel 13 including the third color filter 20R1 corresponding to the red (R1) to be easily enlarged, thereby enhancing the reproducibility of primary colors.

The embodiment allows the light transmission efficiency of the first color filter 20RG1 to be easily increased. Thus, the embodiment uses the first sub-pixel 11 including the first color filter 20RG1 for the reproduction of the yellow Y, thereby reliably achieving the luminance and the saturation of the yellow Y.

In the reflective display device such as the display device in the embodiment, a reflection factor and contrast of the light OL by the reflective electrode 40 remain constant. Meanwhile, the visual quality of colors of an image output by the display device depends on the light source color and luminous intensity of the external light IL. Thus, when the external light IL is obtained under a bright environment, for example, the visual quality of colors of the image tends to be good. In contrast, when the external light IL is obtained under a dark environment, it is relatively difficult to exhibit reliable visibility. The color filter 20 does not completely transmit the external light IL regardless of the peak of the spectrum of the light OL to be transmitted, and absorbs at least part of the external light IL. Trying to darken the reproduced color using the color filter 20 increases a ratio of an absorbed part of the external light IL. Thus, the reflective display device is required to balance the saturation and the luminance by setting the peaks of the spectra of the light OL transmitted through the color filters 20 and adjusting an area ratio of the color filters 20 having different peaks. In other words, the reflective display device has an extreme difficulty in adjusting colors and luminance by adjusting the light source, which can be achieved by a display device having other configurations permitting selection and adjustments of the light source. Application of the present embodiment to even such a reflective display device can still reliably obtain the luminance and saturation of the yellow Y.

In the embodiment, the area ratio of the first color filter 20RG1, the second color filter 20BG1, the third color filter 20R1, and the fourth color filter 20B1, and the spectra of the first red green RG1, the first blue green BG1, the red R1, and the blue B1 are determined depending on the required white point W and the required luminance and the saturation of the yellow Y. The blue B1 in the embodiment and the conventional blue (B), which are identical to each other in FIG. 5, may be different from each other. The red R1 in the embodiment and the conventional red (R), which are identical to each other in FIG. 5, may be different from each other. Although the combination of the first red green RG1 and the first blue green BG1 reproduces the conventional green (G) in FIG. 5, the combination of the first red green RG1 and the first blue green BG1 may reproduce green that is different from the conventional green (G).

Figure 6:
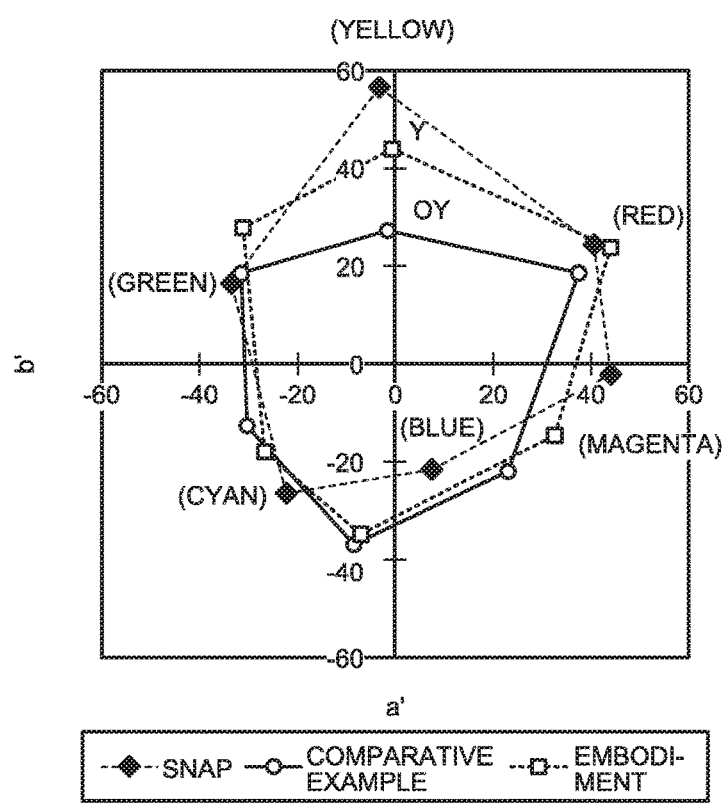
FIG. 6 is a chart indicating exemplary color reproducibility of the embodiment and that of a comparative example in an L*a*b* color space.

FIG. 6 is a chart indicating exemplary color reproducibility of the embodiment and that of a comparative example in an L*a*b* color space. In FIG. 6, SNAP indicates yellow, green, cyan, blue, magenta, and red specified by the Specifications for Newsprint Advertising Production. A display device in the comparative example is an RGBW reflective display device that includes sub-pixels of four colors, i.e., white (W) in addition to the conventional red (R), the conventional green (G), and the conventional blue (B). The display device in the embodiment described with reference to FIGS. 1 to 5 can reproduce the yellow Y that is brighter and more vivid than yellow OY to be reproduced by the display device in the comparative example. The display device in the embodiment can satisfy the demand in advertisement or the like by reproducing the bright and vivid yellow Y as required.

Figure 7:
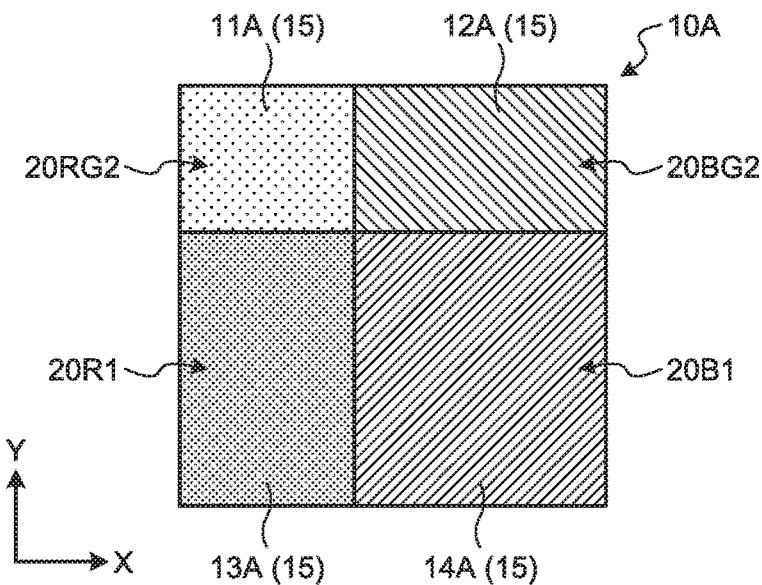
FIG. 7 is a diagram illustrating exemplary shapes and sizes of sub-pixels included in a single pixel, an exemplary positional relation among the sub-pixels, and exemplary color filters of the respective sub-pixels.
Figure 8:
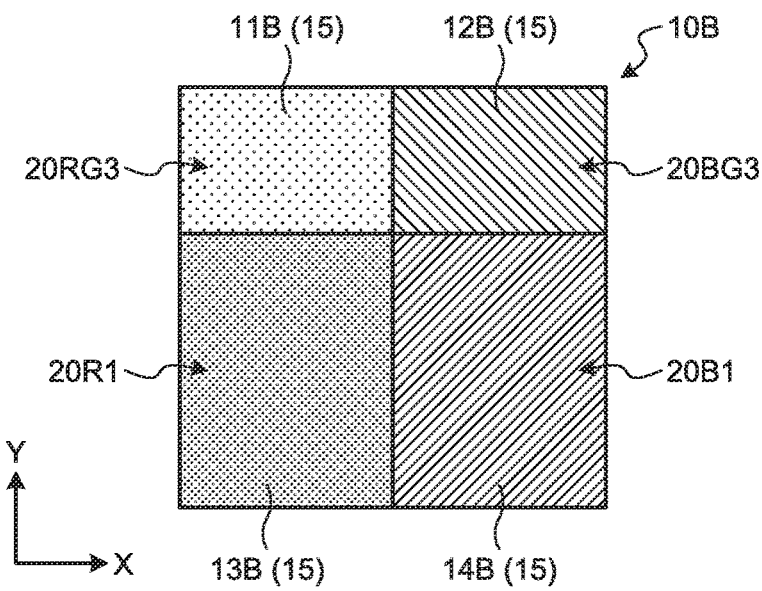
FIG. 8 is a diagram illustrating exemplary shapes and sizes of sub-pixels included in a single pixel, an exemplary positional relation among the sub-pixels, and exemplary color filters of the respective sub-pixels.

FIG. 7 is a diagram illustrating exemplary shapes and sizes of sub-pixels 15 included in a single pixel 10A, an exemplary positional relation among the sub-pixels 15, and exemplary color filters 20 of the respective sub-pixels 15. FIG. 8 is a diagram illustrating exemplary shapes and sizes of sub-pixels 15 included in a single pixel 10B, an exemplary positional relation among the sub-pixels 15, and exemplary color filters 20 of the respective sub-pixels 15. The display device in the embodiment may include, in place of the pixel 10 illustrated in FIG. 3, the pixel 10A illustrated in FIG. 7 or the pixel 10B illustrated in FIG. 8.

The pixel 10A illustrated in FIG. 7 includes a first sub-pixel 11A, a second sub-pixel 12A, a third sub-pixel 13A, and a fourth sub-pixel 14A. The first sub-pixel 11A includes a first color filter 20RG2. The second sub-pixel 12A includes a second color filter 20BG2. The peak of the spectrum of the light transmitted through the first color filter 20RG2 falls on the spectrum of the reddish green (second red green RG2). The peak of the spectrum of the light transmitted through the second color filter 20BG2 falls on the spectrum of the bluish green (second blue green BG2). The third sub-pixel 13A includes the third color filter 20R1, similarly to the third sub-pixel 13 illustrated in FIG. 3. The fourth sub-pixel 14A includes the fourth color filter 20B1, similarly to the fourth sub-pixel 14 illustrated in FIG. 3. The third sub-pixel 13A and the fourth sub-pixel 14A are each greater in size than the first sub-pixel 11A and the second sub-pixel 12A. The first sub-pixel 11A added to the second sub-pixel 12A has a size equal to or greater than a size of the third sub-pixel 13A and has a size equal to or greater than a size of the fourth sub-pixel 14A. The fourth sub-pixel 14A is greater in size than the third sub-pixel 13A. The second sub-pixel 12A is greater in size than the first sub-pixel 11A. When an area ratio of the first sub-pixel 11A, the second sub-pixel 12A, the third sub-pixel 13A, and the fourth sub-pixel 14A is expressed as E to F to G to H, the following expressions hold: $0.65 \leq E < F < 1.0$, $1.0 \leq G < H$, and $H < 1.7$. Further, the expression of E to F=G to H holds in the example illustrated in FIG. 7, but E to F may be a different ratio from that of G to H. A configuration in which the expression of E to F=G to H holds makes it easy to dispose a signal line 61 and a scanning line 62 (see FIG. 19) at a position corresponding to a boundary between sub-pixels 15 having different color filters 20. FIG. 7 illustrates an exemplary case in which the ratio obtained through rounding each value to the third decimal places is expressed as E to F to G to H=0.669 to 0.819 to 1.130 to 1.382. In this case, the first sub-pixel 11A added to the second sub-pixel 12A has a size equal to or greater than a size of the third sub-pixel 13A and has a size equal to or greater than a size of the fourth sub-pixel 14A. Color reproduction by the pixel 10A illustrated in FIG. 7 can be described by reading the first sub-pixel 11, the second sub-pixel 12, the third sub-pixel 13, and the fourth sub-pixel 14 described with reference to FIG. 4 as the first sub-pixel 11A, the second sub-pixel 12A, the third sub-pixel 13A, and the fourth sub-pixel 14A, respectively. In such a pixel, the sub-pixels that are diagonally opposite to each other share no side. More specifically, the pixel is divided into four regions by one vertical line that divides the pixel laterally and one horizontal line that divides the pixel vertically. The vertical line is shifted toward the first sub-pixel (left edge side of the pixel) with respect to a centerline that laterally divides the pixel into half. The horizontal line is shifted toward the first sub-pixel (upper edge side of the pixel) with respect to a centerline that vertically divides the pixel into half. This configuration makes the magnitude relation of E<F≤G<H hold.

The pixel 10B illustrated in FIG. 8 includes a first sub-pixel 11B, a second sub-pixel 12B, a third sub-pixel 13B, and a fourth sub-pixel 14B. The first sub-pixel 11B includes a first color filter 20RG3. The second sub-pixel 12B includes a second color filter 20BG3. The peak of the spectrum of the light transmitted through the first color filter 20RG3 falls on the spectrum of the reddish green (third red green RG3). The peak of the spectrum of the light transmitted through the second color filter 20BG3 falls on the spectrum of the bluish green (third blue green BG3). The third sub-pixel 13B includes the third color filter 20R1, similarly to the third sub-pixel 13 illustrated in FIG. 3. The fourth sub-pixel 14B includes the fourth color filter 20B1, similarly to the fourth sub-pixel 14 illustrated in FIG. 3. The third sub-pixel 13B and the fourth sub-pixel 14B are each greater in size than the first sub-pixel 11B and the second sub-pixel 12B. The first sub-pixel 11B added to the second sub-pixel 12B has a size equal to or greater than a size of the third sub-pixel 13B and has a size equal to or greater than a size of the fourth sub-pixel 14B. The third sub-pixel 13B is identical in size to the fourth sub-pixel 14B. The first sub-pixel 11B is identical in size to the second sub-pixel 12B. When an area ratio of the first sub-pixel 11B, the second sub-pixel 12B, the third sub-pixel 13B, and the fourth sub-pixel 14B is expressed as I to J to K to L, the following expressions hold: 0.65≤I=J<1.0, and 1.0≤K=L≤1.35. FIG. 8 illustrates an exemplary case in which the expression of I to J to K to L=0.744 to 0.744 to 1.256 to 1.256 holds. In this case, the first sub-pixel 11B added to the second sub-pixel 12B has a size equal to or greater than a size of the third sub-pixel 13B and has a size equal to or greater than a size of the fourth sub-pixel 14B. Color reproduction by the pixel 10B illustrated in FIG. 8 can be described by reading the first sub-pixel 11, the second sub-pixel 12, the third sub-pixel 13, and the fourth sub-pixel 14 described with reference to FIG. 4 as the first sub-pixel 11B, the second sub-pixel 12B, the third sub-pixel 13B, and the fourth sub-pixel 14B, respectively. In such a pixel, the sub-pixels that are diagonally opposite to each other share no side. More specifically, the pixel is divided into four regions by one vertical line that divides the pixel laterally and one horizontal line that divides the pixel vertically. The vertical line coincides with a centerline that laterally divides the pixel into half. The horizontal line is shifted toward the first sub-pixel (upper edge side of the pixel) with respect to a centerline that vertically divides the pixel into half. This configuration makes the magnitude relation of I=J<K=L hold.

Figure 9:
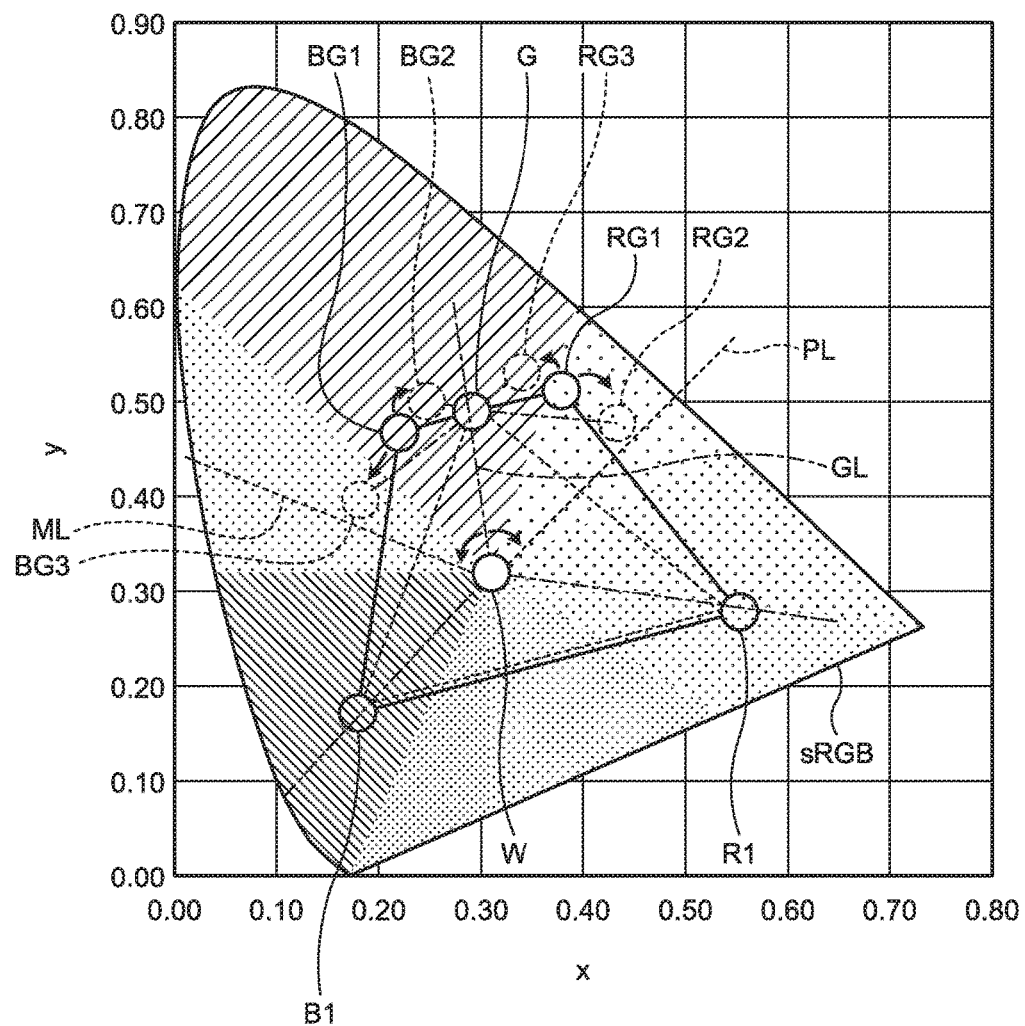
FIG. 9 is a schematic diagram illustrating, in an sRGB color space, a method for determining reddish green and bluish green according to an area ratio of the sub-pixels included in each of different types of a single pixel.

FIG. 9 is a schematic diagram illustrating, in an sRGB color space, a method for determining reddish green and bluish green according to the area ratio of the sub-pixels 15 included in each of the pixel 10, the pixel 10A, and the pixel 10B. FIG. 9 illustrates a dash-single-dot line GL that couples the green G, which is a combined color of the first red green RG1 and the first blue green BG1, with the white point W, while illustrating a broken line PL on the yellow side on which a hue angle is in the positive direction with respect to the dash-single-dot line GL. FIG. 9 illustrates a broken line ML on the cyan side on which the hue angle is in the negative direction with respect to the dash-single-dot line GL.

The first sub-pixel 11A of the pixel 10A illustrated in FIG. 7 is smaller in size than the first sub-pixel 11 of the pixel 10 illustrated in FIG. 3. The second sub-pixel 12A of the pixel 10A illustrated in FIG. 7 is greater in size than the second sub-pixel 12 of the pixel 10 illustrated in FIG. 3. When the characteristics of the color filters 20 of the first sub-pixel 11A and the second sub-pixel 12A are the same as those of the color filters 20 of the first sub-pixel 11 and the second sub-pixel 12, the area allocated to a red component is decreased by a relative amount of the reduced first sub-pixel 11A, and the area allocated to a blue component is increased by a relative amount of the enlarged second sub-pixel 12A. As illustrated in FIG. 9, the hue angle of the second red green RG2 corresponding to the first sub-pixel 11A is on the positive side relative to the hue angle of the first red green RG1 corresponding to the first sub-pixel 11. The hue angle of the second blue green BG2 corresponding to the second sub-pixel 12A is on the positive side relative to the hue angle of the first blue green BG1 corresponding to the second sub-pixel 12. This configuration allows the pixel 10A illustrated in FIG. 7 to achieve the required yellow Y, white point W, and green G equivalent to those in the pixel 10 illustrated in FIG. 3.

The third sub-pixel 13B of the pixel 10B illustrated in FIG. 8 is greater in size than the third sub-pixel 13 of the pixel 10 illustrated in FIG. 3. The fourth sub-pixel 14B of the pixel 10B illustrated in FIG. 8 is smaller in size than the fourth sub-pixel 14 of the pixel 10 illustrated in FIG. 3. When the characteristics of the color filters 20 of the first sub-pixel 11B and the second sub-pixel 12B are the same as those of the color filters 20 of the first sub-pixel 11 and the second sub-pixel 12, the area allocated to the red component is increased by a relative amount of the enlarged third sub-pixel 13B, and the area allocated to the blue component is decreased by a relative amount of the reduced fourth sub-pixel 14B. As illustrated in FIG. 9, the hue angle of the third red green RG3 corresponding to the first sub-pixel 11B is on the negative side relative to the hue angle of the first red green RG1 corresponding to the first sub-pixel 11. The hue angle of the third blue green BG3 corresponding to the second sub-pixel 12B is on the negative side relative to the hue angle of the first blue green BG1 corresponding to the second sub-pixel 12. This configuration allows even the pixel 10B illustrated in FIG. 8 to achieve the required yellow Y, white point W, and green G equivalent to those in the pixel 10 illustrated in FIG. 3.

The first red green RG1, the second red green RG2, and the third red green RG3 have hue on the positive side with respect to the green G and on the negative side with respect to the red R1. The first blue green BG1, the second blue green BG2, and the third blue green BG3 have hue on the negative side (the broken line ML side) with respect to the green G and on the positive side (the broken line PL side) with respect to the blue B1.

As exemplified in FIGS. 3, 7, and 8, in the display device in the embodiment, the four sub-pixels 15 included in the single pixel 10, 10A, or 10B have two or more different types of areas. The sub-pixel 15 including a color filter 20 having a relatively high luminous efficacy has a size equal to or smaller than a size of the sub-pixel 15 including a color filter 20 having a relatively low luminous efficacy. Specifically, the first color filter 20RG1 has a luminous efficacy relatively higher than a luminous efficacy of the second color filter 20BG1. The first color filter 20RG2 has a luminous efficacy relatively higher than a luminous efficacy of the second color filter 20BG2. The first color filter 20RG3 has a luminous efficacy relatively higher than a luminous efficacy of the second color filter 20BG3. Further, the first red green RG1, the second red green RG2, and the third red green RG3, and the first blue green BG1, the second blue green BG2, and the third blue green BG3 each have a luminous efficacy relatively higher than a luminous efficacy of the red R1. The red R1 has a luminous efficacy relatively higher than a luminous efficacy of the blue B1. For the reproduction of yellow, the display device in the embodiment uses three sub-pixels 15 excluding the fourth sub-pixel (e.g., fourth sub-pixel 14) that includes the fourth color filter 20B1. A total area of the three sub-pixels 15 used for reproducing the yellow Y may be equal to or greater than twice the area of the fourth sub-pixel. Alternatively, the three sub-pixels other than the fourth sub-pixel may be used to reproduce yellow regardless of the gradation value or the three sub-pixels other than the fourth sub-pixel may be used to reproduce yellow having a predetermined gradation value or higher. The yellow having the predetermined gradation value or higher refers to yellow having relatively high luminance and saturation as required, that is, yellow exceeding a predetermined halftone. This configuration uses the first sub-pixel (e.g., first sub-pixel 11) and the third sub-pixel (e.g., third sub-pixel 13) to reproduce yellow having the halftone or lower.

The sub-pixels 15 having a relatively high luminance efficacy are adjacent to each other in the X-direction or the Y-direction. For example, in FIG. 3, the first sub-pixel 11 is adjacent to the second sub-pixel 12. In FIG. 7, the first sub-pixel 11A is adjacent to the second sub-pixel 12A. In FIG. 8, the first sub-pixel 11B is adjacent to the second sub-pixel 12B.

In the following description, the hue of the light OL transmitted through the color filter 20 included in a single sub-pixel 15 is regarded as a reference. The two sub-pixels 15 disposed in juxtaposition to one sub-pixel 15 transmit the light OL having a hue closer to the reference than the remaining one sub-pixel 15 does. The sub-pixels 15 are juxtaposed in the X-direction or the Y-direction. For example, in FIG. 3, the hue (first blue green BG1) of the second sub-pixel 12 and the hue (red R1) of the third sub-pixel 13 are closer to the hue (first red green RG1) of the first sub-pixel 11 than the hue (blue B1) of the fourth sub-pixel 14 disposed in a diagonal direction of the first sub-pixel 11 is. The hue (first blue green BG1) of the second sub-pixel 12 and the hue (red R1) of the third sub-pixel 13 are closer to the hue (blue B1) of the fourth sub-pixel 14 than the hue (first red green RG1) of the first sub-pixel 11 disposed in a diagonal direction of the fourth sub-pixel 14 is. The diagonal direction extends along the X-Y plane and intersects the X-direction and the Y-direction. Further, the hue (first red green RG1) of the first sub-pixel 11 and the hue (blue B1) of the fourth sub-pixel 14 are closer to the hue (first blue green BG1) of the second sub-pixel 12 than the hue (red R1) of the third sub-pixel 13 disposed in a diagonal direction of the second sub-pixel 12 is. The hue (first red green RG1) of the first sub-pixel 11 and the hue (blue B1) of the fourth sub-pixel 14 are closer to the hue (red R1) of the third sub-pixel 13 than the hue (first blue green BG1) of the second sub-pixel 12 disposed in a diagonal direction of the third sub-pixel 13 is. Relations of hues among the sub-pixels 15 illustrated in FIG. 7 can be described by reading the first sub-pixel 11, the second sub-pixel 12, the third sub-pixel 13, and the fourth sub-pixel 14 described with reference to FIG. 3 as the first sub-pixel 11A, the second sub-pixel 12A, the third sub-pixel 13A, and the fourth sub-pixel 14A, respectively. Relations of hues among the sub-pixels 15 illustrated in FIG. 8 can be described by reading the first sub-pixel 11, the second sub-pixel 12, the third sub-pixel 13, and the fourth sub-pixel 14 described with reference to FIG. 3 as the first sub-pixel 11B, the second sub-pixel 12B, the third sub-pixel 13B, and the fourth sub-pixel 14B, respectively.

Figure 10:
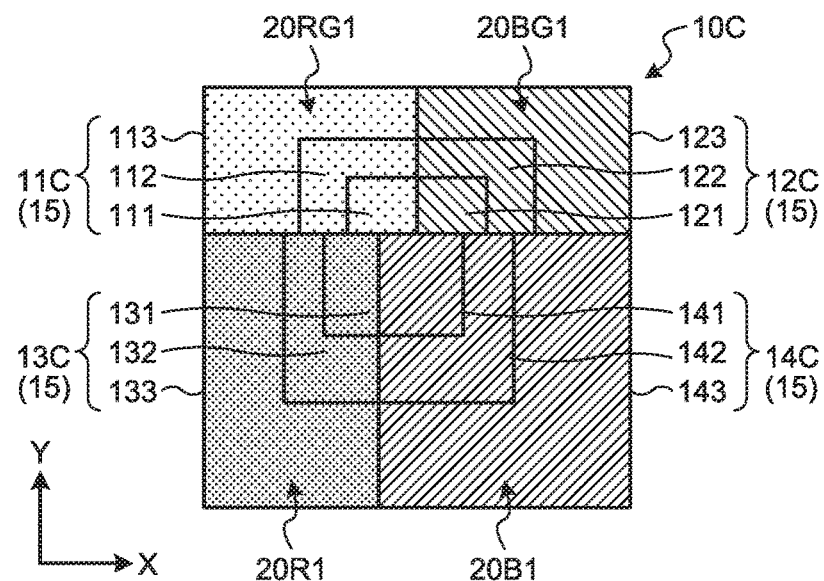
FIG. 10 is a diagram illustrating an example of dividing each sub-pixel into a plurality of regions having different areas for area coverage modulation.

FIG. 10 is a diagram illustrating an example of dividing each sub-pixel 15 into a plurality of regions having different areas for area coverage modulation. In the display device in the embodiment, a pixel 10C includes a first sub-pixel 11C, a second sub-pixel 12C, a third sub-pixel 13C, and a fourth sub-pixel 14C, for example, as illustrated in FIG. 10. The first sub-pixel 11C including the first color filter 20RG1 includes three regions having different areas including a first sub-divided pixel 111, a second sub-divided pixel 112, and a third sub-divided pixel 113. The first sub-divided pixel 111, the second sub-divided pixel 112, and the third sub-divided pixel 113 have an area ratio of, for example, 1 to 2 to 4 (=$2^0$ to $2^1$ to $2^2$). The first sub-pixel 11C has gradation performance of three bits (eight gradations) through combinations of whether each of the first sub-divided pixel 111, the second sub-divided pixel 112, and the third sub-divided pixel 113 transmits light. More specifically, area coverage modulation performed through the combination patters of whether each of the first sub-divided pixel 111, the second sub-divided pixel 112, and the third sub-divided pixel 113 transmits light is expressed as "0 to 0 to 0", "1 to 0 to 0", "0 to 1 to 0", "1 to 1 to 0", "0 to 0 to 1", "1 to 0 to 1", "0 to 1 to 1", and "1 to 1 to 1" in ascending order of an output gradation, where 1 denotes that the specific sub-divided pixel transmits light and 0 denotes that the specific sub-divided pixel does not transmit light. A black matrix 23 (see FIG. 20) is disposed between the sub-pixels 15. For example, the black matrix 23 is disposed among a plurality of color filters 20. For example, the black matrix 23 may be a black filter or may be configured such that the color filters of two adjacent sub-pixels are superimposed on top of one another to reduce a transmission factor in the overlapping part. The black matrix 23 may be omitted. A ratio of area coverage modulation by the sub-divided pixels (e.g., 1 to 2 to 4) corresponds to an aperture ratio in a plan view. Thus, in a configuration including the black matrix 23, the ratio of area coverage modulation corresponds to a ratio of openings on which the black matrix 23 is not disposed. In a configuration without the black matrix 23, the ratio of area coverage modulation corresponds to an area ratio of the reflective electrodes 40 included in the respective sub-divided pixels. Specific shapes of the reflective electrodes 40 vary depending on how the sub-pixel is divided. For example, in FIG. 10, the reflective electrodes 40 having a rectangular shape, an L-shape, and an L-shape are provided from the central side of the pixel 10C with the respective sub-divided pixels.

The second sub-pixel 12C including the second color filter 20BG1 includes a plurality of sub-divided pixels that may be a first sub-divided pixel 121, a second sub-divided pixel 122, and a third sub-divided pixel 123. The third sub-pixel 13C including the third color filter 20R1 includes a plurality of sub-divided pixels that may be a first sub-divided pixel 131, a second sub-divided pixel 132, and a third sub-divided pixel 133. The fourth sub-pixel 14C including the fourth color filter 20B1 includes a plurality of sub-divided pixels that may be a first sub-divided pixel 141, a second sub-divided pixel 142, and a third sub-divided pixel 143. The second sub-pixel 12C, the third sub-pixel 13C, and the fourth sub-pixel 14C each achieve the area coverage modulation through the same mechanism as that of the first sub-pixel 11C.

The first sub-pixel 11C, the second sub-pixel 12C, the third sub-pixel 13C, and the fourth sub-pixel 14C are configured in the same manner as the first sub-pixel 11, the second sub-pixel 12, the third sub-pixel 13, and the fourth sub-pixel 14 described above, respectively, except that the first sub-pixel 11C, the second sub-pixel 12C, the third sub-pixel 13C, and the fourth sub-pixel 14C each include the sub-divided pixels. The sub-pixels 15 included in the pixel 10A illustrated in FIG. 7 and the pixel 10B illustrated in FIG. 8 may each be divided into a plurality of sub-divided pixels like the sub-pixels 15 included in the pixel 10C illustrated in FIG. 10.

Figure 11:
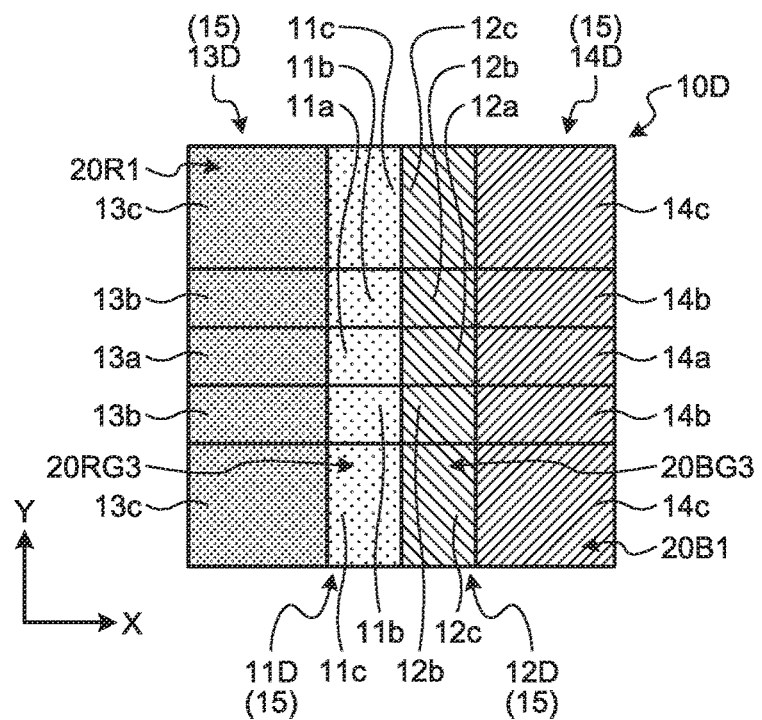
FIG. 11 is a diagram illustrating another example of dividing each sub-pixel into a plurality of regions having different areas for area coverage modulation.

FIG. 11 is a diagram illustrating another example of dividing each sub-pixel 15 into a plurality of regions having different areas for area coverage modulation. Shapes and arrangements of the sub-pixels 15 exemplified in FIGS. 3, 7, 8, and 10 are illustrative only and can be modified as appropriate. As illustrated in FIG. 11, for example, a pixel 10D includes the sub-pixels 15 including a third sub-pixel 13D, a first sub-pixel 11D, a second sub-pixel 12D, and a fourth sub-pixel 14D sequentially arranged from one end side in the X-direction. The sub-pixels 15 each have a stripe shape. These sub-pixels have widths in the X-direction, the relation of which is expressed as follows: width of the first sub-pixel=width of the second sub-pixel<width of the third sub-pixel=width of the fourth sub-pixel. The first sub-pixel 11D including the first color filter 20RG3 includes a plurality of sub-divided pixels that may be a first sub-divided pixel 11a, second sub-divided pixels 11b, and third sub-divided pixels 11c. An area ratio among the central first sub-divided pixel 11a, a pair of the upper and lower second sub-divided pixels 11b, and a pair of the upper and lower third sub-divided pixels 11c is, for example, 1 to 2 to 4. The first sub-pixel 11D has gradation performance of three bits (eight gradations) through combinations of whether each of the first sub-divided pixel 11a, the second sub-divided pixel 11b, and the third sub-divided pixel 11c transmits light. In the embodiment, the second sub-divided pixels 11b, which are disposed separately from each other, are turned ON or OFF simultaneously. This also holds for the third sub-divided pixels 11c. The second sub-pixel 12D including the second color filter 20BG3 includes a plurality of sub-divided pixels that may be a first sub-divided pixel 12a, second sub-divided pixels 12b, and third sub-divided pixels 12c. The third sub-pixel 13D including the third color filter 20R1 includes a plurality of sub-divided pixels that may be a first sub-divided pixel 13a, second sub-divided pixels 13b, and third sub-divided pixels 13c. The fourth sub-pixel 14D including the fourth color filter 20B1 includes a plurality of sub-divided pixels that may be a first sub-divided pixel 14a, second sub-divided pixels 14b, and third sub-divided pixels 14c. The second sub-pixel 12D, the third sub-pixel 13D, and the fourth sub-pixel 14D each achieve the area coverage modulation through the same mechanism as that of the first sub-pixel 11D.

The first sub-pixel 11D, the second sub-pixel 12D, the third sub-pixel 13D, and the fourth sub-pixel 14D are configured in the same manner as the first sub-pixel 11B, the second sub-pixel 12B, the third sub-pixel 13B, and the fourth sub-pixel 14B described above, respectively, except that the first sub-pixel 11D, the second sub-pixel 12D, the third sub-pixel 13D, and the fourth sub-pixel 14D each include the sub-divided pixels. FIG. 11 illustrates a case in which an area ratio among the first sub-pixel 11D, the second sub-pixel 12D, the third sub-pixel 13D, and the fourth sub-pixel 14D is the same as that among the first sub-pixel 11B, the second sub-pixel 12B, the third sub-pixel 13B, and the fourth sub-pixel 14B illustrated in FIG. 8. However, the present disclosure is not limited thereto. The area ratio of the stripe-shaped sub-pixels 15 as illustrated in FIG. 11 may be set to be the same as that of the first sub-pixel 11, the second sub-pixel 12, the third sub-pixel 13, and the fourth sub-pixel 14 illustrated in FIG. 3 or as that of the first sub-pixel 11A, the second sub-pixel 12A, the third sub-pixel 13A, and the fourth sub-pixel 14A illustrated in FIG. 7. Further, in the stripe-shaped sub-pixels 15 as illustrated in FIG. 11, two sub-pixels 15 adjacent to one sub-pixel 15 that serves as a reference preferably have a hue closer to the hue of the reference sub-pixel 15 than the hue of the remaining one sub-pixel 15. In the example illustrated in FIG. 11, the one sub-pixel 15 that serves as the reference is the first sub-pixel 11D or the second sub-pixel 12D.

As described above, the sub-pixels 15 illustrated in FIGS. 10 and 11 are each divided into a plurality of sub-divided pixels having different areas. Gradation expression for each of the sub-pixels 15 is performed through a combination of whether each of the sub-divided pixels transmits light. The number of sub-divided pixels included in a single sub-pixel 15 may be two, or four or more. Gradation performance of a single sub-pixel 15 in the area coverage modulation is indicated by the number of bits (N bits) corresponding to the number (N) of the sub-divided pixels, where N is a natural number of 2 or greater. Assuming that the area of the smallest sub-divided pixel is 1, the q-th (q-th bit) sub-divided pixel from the smallest sub-divided pixel has an area of $2^{(q-1)}$.

The display device may have a plurality of patterns of area coverage modulation, that is, patterns of combinations of whether each of the sub-divided pixels reflects light according to an input signal. The following describes, based on a pixel 10E in FIG. 12 to be described later, patterns of area coverage modulation.

Figure 12:
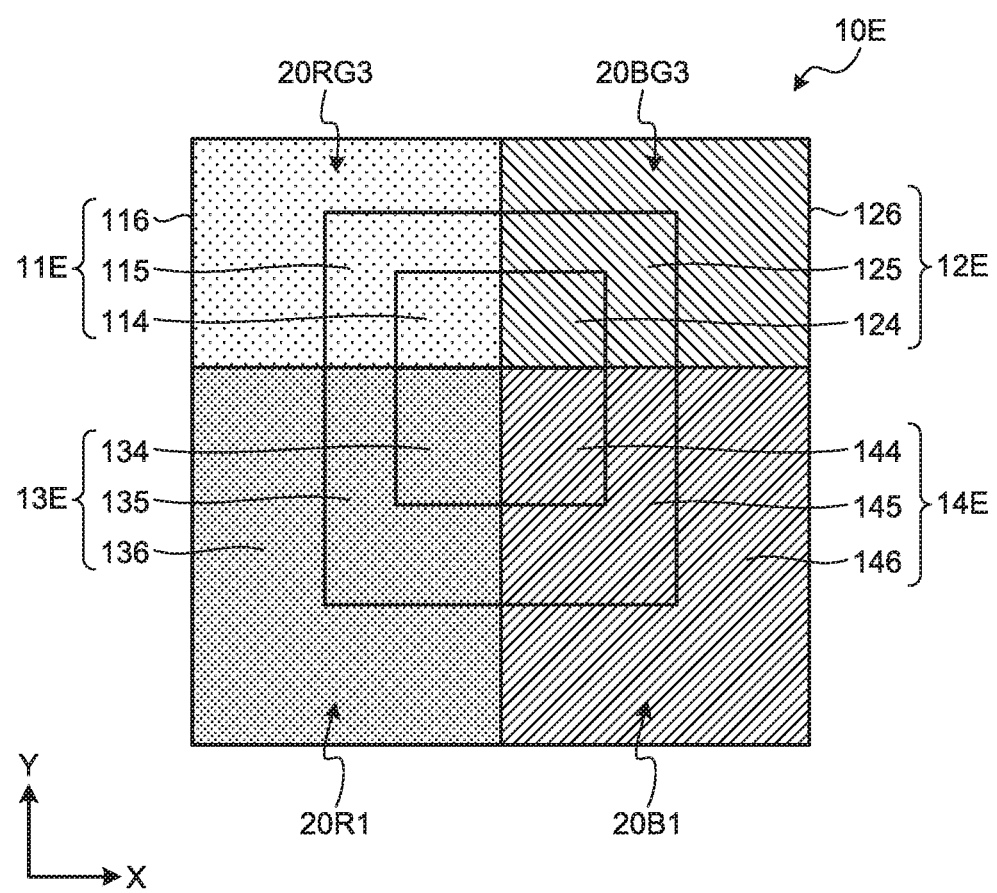
FIG. 12 is a diagram illustrating still another example in which the sub-pixel is divided into a plurality of sub-divided pixels for area coverage modulation.

FIG. 12 is a diagram illustrating still another example in which the sub-pixel 15 is divided into a plurality of sub-divided pixels for area coverage modulation. The pixel 10E includes a first sub-pixel 11E, a second sub-pixel 12E, a third sub-pixel 13E, and a fourth sub-pixel 14E. The first sub-pixel 11E including the first color filter 20RG3 includes a plurality of sub-divided pixels including a first sub-divided pixel 114, a second sub-divided pixel 115, and a third sub-divided pixel 116. The first sub-divided pixel 114, the second sub-divided pixel 115, and the third sub-divided pixel 116 have an area ratio of, for example, 1 to 2 to 4. The second sub-pixel 12E including the second color filter 20BG3 includes a first sub-divided pixel 124, a second sub-divided pixel 125, and a third sub-divided pixel 126. The third sub-pixel 13E including the third color filter 20R1 includes a first sub-divided pixel 134, a second sub-divided pixel 135, and a third sub-divided pixel 136. The fourth sub-pixel 14E including the fourth color filter 20B1 includes a first sub-divided pixel 144, a second sub-divided pixel 145, and a third sub-divided pixel 146. The first sub-pixel 11E, the second sub-pixel 12E, the third sub-pixel 13E, and the fourth sub-pixel 14E have an area ratio identical to the area ratio of the first sub-pixel 11B, the second sub-pixel 12B, the third sub-pixel 13B, and the fourth sub-pixel 14B.

Figure 13:
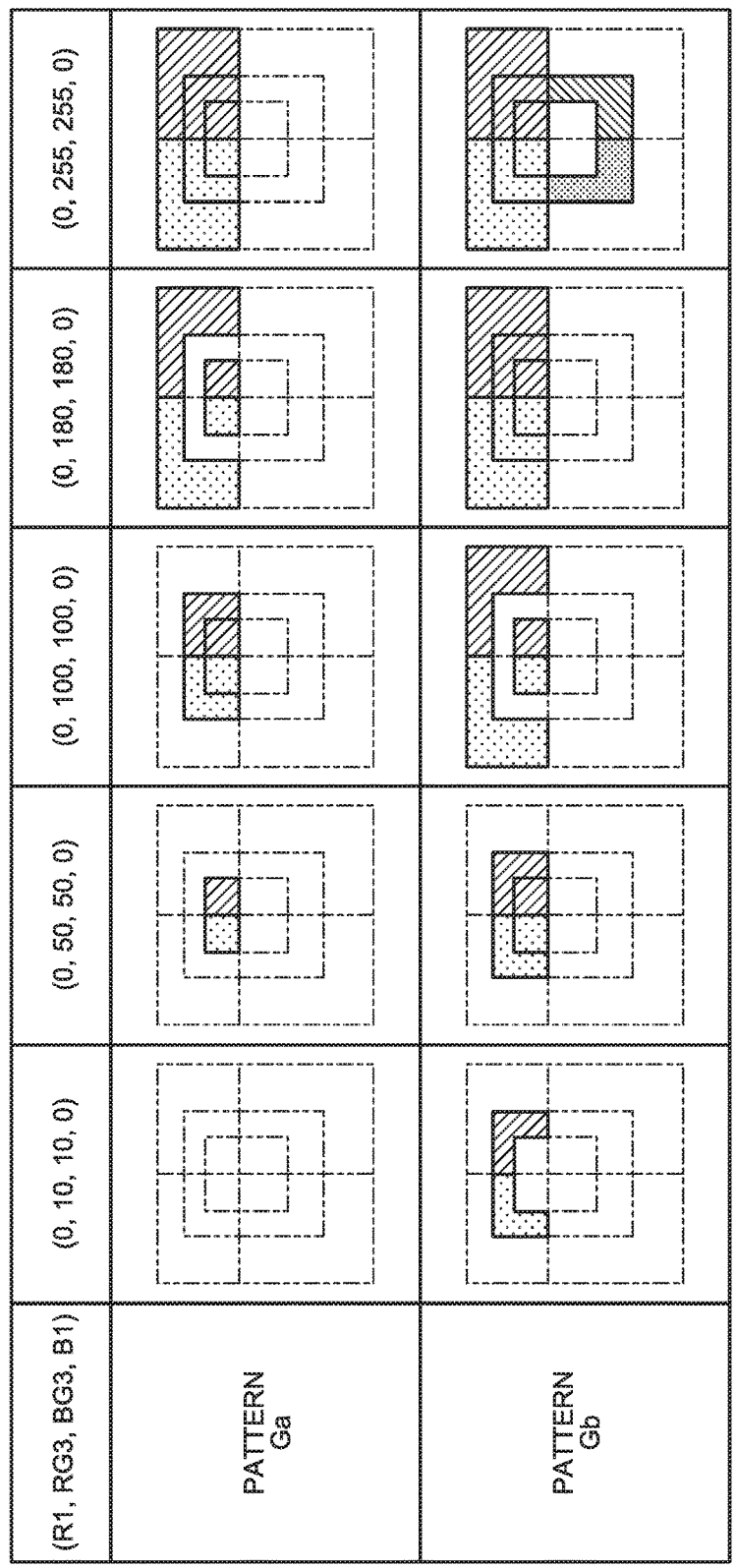
FIG. 13 is a diagram illustrating an example of area coverage modulation including a plurality of patterns.
Figure 14:
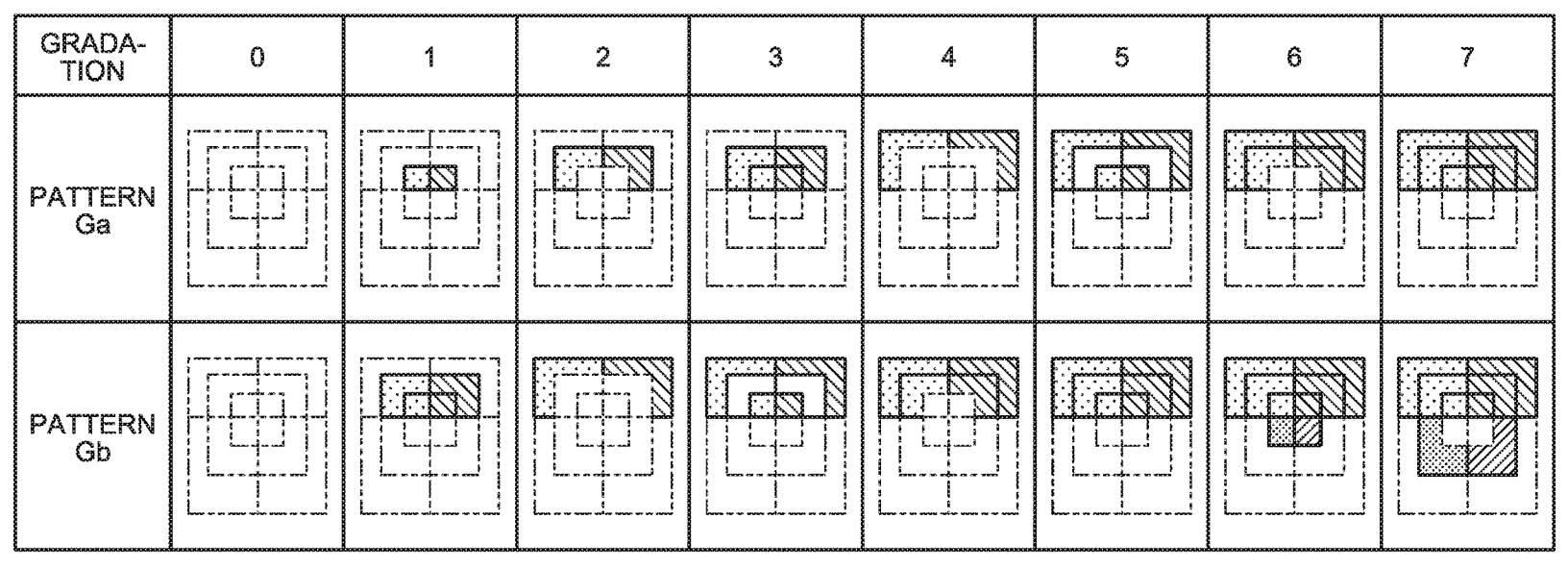

FIGS. 13 and 14 are diagrams each illustrating exemplary area coverage modulation including a plurality of patterns. Each of the patterns exemplified in FIGS. 13, 14, and 17 to be described later represents a pattern of an output through the pixel 10E described with reference to FIG. 12.

In a configuration in which a single sub-pixel 15 includes three sub-divided pixels as in the pixel 10E illustrated in FIG. 12, N=3 and thus the area coverage modulation of three bits (eight steps) can be performed. As one example, assume that an area coverage modulation value, which is variable in eight steps, is represented by any numeric value from 0 to 7, and an 8-bit gradation value (any numeric value from 0 to 255) is converted to a corresponding area coverage modulation value. In this case, a correspondence between the area coverage modulation values and the 8-bit gradation values is, for example, as follows:

0: 0 to 31;
1: 32 to 63;
2: 64 to 95;
3: 96 to 127;
4: 128 to 159;
5: 160 to 191;
6: 192 to 223;
7: 224 to 255.

A pattern Ga illustrated in FIG. 13 represents a pattern of area coverage modulation based on the abovementioned correspondence. The above division example assumes gradation values corresponding to a linear space of 0 to 1.0 in which the gradation values are not subjected to gamma correction. The division may be different when the gamma correction is applied.

FIG. 13 exemplifies (R1, RG3, BG3, B1) as the 8-bit gradation values that are converted to area coverage modulation values. The gradation values of (R1, RG3, BG3, B1)=(0, 10, 10, 0) exemplified in FIG. 13 are converted to the area coverage modulation values of (0, 0, 0, 0) based on the above correspondence. All pixels are OFF as the output of the pixel 10E corresponding to (0, 0, 0, 0). The gradation values of (R1, RG3, BG3, B1)=(0, 50, 50, 0) are converted to the area coverage modulation values of (0, 1, 1, 0) based on the above correspondence. The output of the pixel 10E corresponding to the values of (0, 1, 1, 0) is an output obtained by using the first sub-divided pixel 114 of the first sub-pixel 11E and the first sub-divided pixel 124 of the second sub-pixel 12E. The gradation values of (R1, RG3, BG3, B1)=(0, 100, 100, 0) are converted to the area coverage modulation values of (0, 3, 3, 0) based on the above correspondence. The output of the pixel 10E corresponding to the values of (0, 3, 3, 0) is an output obtained by using the first sub-divided pixel 114 and the second sub-divided pixel 115 of the first sub-pixel 11E and the first sub-divided pixel 124 and the second sub-divided pixel 125 of the second sub-pixel 12E. The gradation values of (R1, RG3, BG3, B1)=(0, 180, 180, 0) are converted to the area coverage modulation values of (0, 5, 5, 0) based on the above correspondence. The output of the pixel 10E corresponding to the values of (0, 5, 5, 0) is an output obtained by using the first sub-divided pixel 114 and the third sub-divided pixel 116 of the first sub-pixel 11E and the first sub-divided pixel 124 and the third sub-divided pixel 126 of the second sub-pixel 12E. The gradation values of (R1, RG3, BG3, B1)=(0, 255, 255, 0) are converted to the area coverage modulation values of (0, 7, 7, 0) based on the above correspondence. The output of the pixel 10E corresponding to the values of (0, 7, 7, 0) is an output obtained by using the first sub-divided pixel 114, the second sub-divided pixel 115, and the third sub-divided pixel 116 of the first sub-pixel 11E and the first sub-divided pixel 124, the second sub-divided pixel 125, and the third sub-divided pixel 126 of the second sub-pixel 12E.

The output of the pixel 10E corresponding to the values of (0, 2, 2, 0), which is omitted in FIG. 13, is an output obtained by using the second sub-divided pixel 115 of the first sub-pixel 11E and the second sub-divided pixel 125 of the second sub-pixel 12E. The output of the pixel 10E corresponding to the values of (0, 4, 4, 0) is an output obtained by using the third sub-divided pixel 116 of the first sub-pixel 11E and the third sub-divided pixel 126 of the second sub-pixel 12E. The output of the pixel 10E corresponding to the values of (0, 6, 6, 0) is an output obtained by using the second sub-divided pixel 115 and the third sub-divided pixel 116 of the first sub-pixel 11E and the second sub-divided pixel 125 and the third sub-divided pixel 126 of the second sub-pixel 12E.

A pattern Gb illustrated in FIG. 13 represents a pattern of area coverage modulation with which higher luminance can be obtained than with the pattern Ga. For example, when the gradation values of (R1, RG3, BG3, B1) are (0, 10, 10, 0), all pixels are OFF in the pattern Ga, while in the pattern Ga, the output in the pattern Gb is obtained by using the second sub-divided pixel 115 of the first sub-pixel 11E and the second sub-divided pixel 125 of the second sub-pixel 12E. Specifically, the 8-bit gradation values to be converted to the area coverage modulation values of (0, 0, 0, 0) in the pattern Ga, except the case where the gradation values of (R1, RG3, BG3, B1) are (0, 0, 0, 0), are converted to the area coverage modulation values of (0, 2, 2, 0) in the pattern Gb. When the gradation values of (R1, RG3, BG3, B1) are (0, 0, 0, 0), the gradation values are converted to the area coverage modulation values of (0, 0, 0, 0) in both the pattern Ga and Gb. Thus, dark color (black) with higher contrast can be obtained even in the pattern Gb.

The 8-bit gradation values to be converted to the area coverage modulation values of (0, 1, 1, 0) in the pattern Ga are converted to the area coverage modulation values of (0, 3, 3, 0) in the pattern Gb. The 8-bit gradation values to be converted to the area coverage modulation values of (0, 3, 3, 0) in the pattern Ga are converted to the area coverage modulation values of (0, 5, 5, 0) in the pattern Gb. The 8-bit gradation values to be converted to the area coverage modulation values of (0, 5, 5, 0) in the pattern Ga are converted to the area coverage modulation values of (0, 7, 7, 0) in the pattern Gb. In this manner, the area coverage modulation values of the sub-pixels 15 in the pattern Gb are set to take the area coverage modulation values of the sub-pixels 15 obtained by adding 2 to the area coverage modulation values excluding 0 in the pattern Ga. More specifically, a correspondence between the area coverage modulation values and the 8-bit gradation values in the pattern Gb is as follows:

0: 0;
2: 1 to 31;
3: 32 to 63;
4: 64 to 95;
5: 96 to 127;
6: 128 to 159;
7: 160 to 255.

Consequently, the pattern Gb functions as a pattern of area coverage modulation with which higher luminance can be obtained than that can be obtained by the pattern Ga.

The maximum area coverage modulation value of each sub-pixel 15 is 7. When the area coverage modulation value of a sub-pixel 15 obtained by adding 2 to the area coverage modulation value excluding 0 in the pattern Ga exceeds 7, the area coverage modulation value of the sub-pixel 15 in the pattern Gb is set to 7. Assuming that the area coverage modulation value is set by simply adding 2 to the area coverage modulation value excluding 0 in the pattern Ga, the 8-bit gradation values to be converted to the area coverage modulation values of (0, 7, 7, 0) in the pattern Ga are converted to the area coverage modulation values of (0, 9, 9, 0) in the pattern Gb. However, each of the three sub-divided pixels of a single sub-pixel 15 is not assumed to have an output corresponding to an area coverage modulation value of 9. Thus, in the pattern Gb, a difference value from 7 out of the area coverage modulation value of the sub-pixel 15 is allocated to an area coverage modulation value of other sub-pixel 15 taking a numeric value less than 7. Specifically, the 8-bit gradation values to be converted to the area coverage modulation values of (0, 7, 7, 0) in the pattern Ga are converted to the area coverage modulation values of (2, 7, 7, 2) in the pattern Gb. In this case, the output is obtained by using the first sub-divided pixel 114, the second sub-divided pixel 115, and the third sub-divided pixel 116 of the first sub-pixel 11E, the first sub-divided pixel 124, the second sub-divided pixel 125, and the third sub-divided pixel 126 of the second sub-pixel 12E, the second sub-divided pixel 135 of the third sub-pixel 13E, and the second sub-divided pixel 145 of the fourth sub-pixel 14E.

The 8-bit gradation values to be converted to the area coverage modulation values of (0, 6, 6, 0) in the pattern Ga, which is not illustrated, are converted to the area coverage modulation values of (1, 7, 7, 1) in the pattern Gb. In this case, the output is obtained by using the first sub-divided pixel 114, the second sub-divided pixel 115, and the third sub-divided pixel 116 of the first sub-pixel 11E, the first sub-divided pixel 124, the second sub-divided pixel 125, and the third sub-divided pixel 126 of the second sub-pixel 12E, the first sub-divided pixel 134 of the third sub-pixel 13E, and the first sub-divided pixel 144 of the third sub-pixel 13E.

As another example, assume that any numeric value, which is variable in eight steps, is represented by any numeric value from 0 to 7, and an 8-bit gradation value (any numeric value from 0 to 255) is converted to a corresponding area coverage modulation value. In this case, a correspondence between the area coverage modulation values and the 8-bit gradation values is, for example, as follows:

0: 0;
1: 1 to 63;
2: 64 to 95;
3: 96 to 127;
4: 128 to 159;
5: 160 to 191;
6: 192 to 223;
7: 224 to 255.

One method of achieving eight-step gradation using three sub-divided pixels is exemplified in the pattern Ga of FIG. 14. This method differs from the method described previously with reference to FIG. 13. Specifically, assuming that P1 denotes the area coverage modulation value variable in eight steps; P2 denotes whether the first sub-divided pixel is used; P3 denotes whether the second sub-divided pixel is used; P4 denotes whether the third sub-divided pixel is used; an expression of (P1: P2+P3+P4) is given, and the relations described below hold. Here, P1 takes any value from 0 to 7; P2 takes a value of 1 when the first sub-divided pixel is used; P3 takes a value of 2 when the second sub-divided pixel is used; and P4 takes a value of 3 when the third sub-divided pixel is used, P2, P3, and P4 each take a value of 0 when the corresponding sub-divided pixel is not used. The expression that "the sub-divided pixel is used" refers to a control to achieve higher luminance than the case where "the sub-divided pixel is not used".

(0: 0+0+0)
(1: 1+0+0)
(2: 0+2+0)
(3: 1+2+0)
(4: 0+0+3)
(5: 1+0+3)
(6: 0+2+3)
(7: 1+2+3)

In the pattern Ga, the output of the pixel 10E corresponding to the area coverage modulation values of (0, 0, 0, 0) is obtained without using any of the sub-divided pixels, for example. The output of the pixel 10E corresponding to the area coverage modulation values of (0, 1, 1, 0) is an output obtained by using the first sub-divided pixel 114 of the first sub-pixel 11E and the first sub-divided pixel 124 of the second sub-pixel 12E. The output of the pixel 10E corresponding to the area coverage modulation values of (0, 2, 2, 0) is an output obtained by using the second sub-divided pixel 115 of the first sub-pixel 11E and the second sub-divided pixel 125 of the second sub-pixel 12E. The output of the pixel 10E corresponding to the area coverage modulation values of (0, 3, 3, 0) is an output obtained by using the first sub-divided pixel 114 and the second sub-divided pixel 115 of the first sub-pixel 11E and the first sub-divided pixel 124 and the second sub-divided pixel 125 of the second sub-pixel 12E. The output of the pixel 10E corresponding to the area coverage modulation values of (0, 4, 4, 0) is an output obtained by using the third sub-divided pixel 116 of the first sub-pixel 11E and the third sub-divided pixel 126 of the second sub-pixel 12E. The output of the pixel 10E corresponding to the area coverage modulation values of (0, 5, 5, 0) is an output obtained by using the first sub-divided pixel 114 and the third sub-divided pixel 116 of the first sub-pixel 11E and the first sub-divided pixel 124 and the third sub-divided pixel 126 of the second sub-pixel 12E. The output of the pixel 10E corresponding to the area coverage modulation values of (0, 6, 6, 0) is an output obtained by using the second sub-divided pixel 115 and the third sub-divided pixel 116 of the first sub-pixel 11E and the second sub-divided pixel 125 and the third sub-divided pixel 126 of the second sub-pixel 12E. The output of the pixel 10E corresponding to the area coverage modulation values of (0, 7, 7, 0) is an output obtained by using the first sub-divided pixel 114, the second sub-divided pixel 115, and the third sub-divided pixel 116 of the first sub-pixel 11E and the first sub-divided pixel 124, the second sub-divided pixel 125, and the third sub-divided pixel 126 of the second sub-pixel 12E. That is, the pattern Ga represents a pattern (first pattern) in which, when a pixel signal to set sub-divided pixels of a certain sub-pixel 15 to a maximum gradation state (P1=7) is received, an output signal to bring all the sub-divided pixels of the certain sub-pixel 15 of a corresponding color to a lighting state (P2+P3+P4=1+2+3) is supplied to the certain sub-pixel 15.

On the other hand, the pattern Gb illustrated in FIG. 14 represents a pattern of area coverage modulation with which higher luminance can be obtained than that can be obtained by the pattern Ga. The pattern Gb represents a pattern (second pattern) in which, when a pixel signal to set sub-divided pixels of a certain sub-pixel 15 to the maximum gradation state is received, an output signal to bring all the sub-divided pixels of the certain sub-pixel 15 of a corresponding color to a lighting state is supplied to the certain sub-pixel 15, and an output signal to bring any of sub-divided pixels of a sub-pixel 15 different from the certain sub-pixel 15 to a lighting state is supplied to the sub-pixel 15 different from the certain sub-pixel 15. As a specific example, the pattern Gb represented by P1, P2, P3, P4, and the like described above is as follows:

(0: 0+0+0)
(1: 1+2+0)
(2: 0+0+3)
(3: 1+0+3)
(4: 0+2+3)
(5: 1+2+3)
(6: 1+2+3+α)
(7: 1+2+3+β)

Where α when P1=6 and β when P1=7 denote "any of the sub-divided pixels of the sub-pixel 15 different from the certain sub-pixel 15".

In the pattern Gb, the output of the pixel 10E corresponding to the area coverage modulation values of (0, 0, 0, 0), for example, is an output obtained without using any of the sub-divided pixels. The output of the pixel 10E corresponding to the area coverage modulation values of (0, 1, 1, 0) is an output obtained by using the first sub-divided pixel 114 and the second sub-divided pixel 115 of the first sub-pixel 11E and the first sub-divided pixel 124 and the second sub-divided pixel 125 of the second sub-pixel 12E. The output of the pixel 10E corresponding to the area coverage modulation values of (0, 2, 2, 0) is an output obtained by using the third sub-divided pixel 116 of the first sub-pixel 11E and the third sub-divided pixel 126 of the second sub-pixel 12E. The output of the pixel 10E corresponding to the area coverage modulation values of (0, 3, 3, 0) is an output obtained by using the first sub-divided pixel 114 and the third sub-divided pixel 116 of the first sub-pixel 11E and the first sub-divided pixel 124 and the third sub-divided pixel 126 of the second sub-pixel 12E. The output of the pixel 10E corresponding to the area coverage modulation values of (0, 4, 4, 0) is an output obtained by using the second sub-divided pixel 115 and the third sub-divided pixel 116 of the first sub-pixel 11E and the second sub-divided pixel 125 and the third sub-divided pixel 126 of the second sub-pixel 12E. The output of the pixel 10E corresponding to the area coverage modulation values of (0, 5, 5, 0) is an output obtained by using the first sub-divided pixel 114, the second sub-divided pixel 115, and the third sub-divided pixel 116 of the first sub-pixel 11E and the first sub-divided pixel 124, the second sub-divided pixel 125, and the third sub-divided pixel 126 of the second sub-pixel 12E.

The output of the pixel 10E corresponding to the area coverage modulation values of (0, 6, 6, 0) in the pattern Gb illustrated in FIG. 14 is an output obtained by using the first sub-divided pixel 114, the second sub-divided pixel 115, and the third sub-divided pixel 116 of the first sub-pixel 11E, the first sub-divided pixel 124, the second sub-divided pixel 125, and the third sub-divided pixel 126 of the second sub-pixel 12E, the first sub-divided pixel 134 of the third sub-pixel 13E, and the first sub-divided pixel 144 of the fourth sub-pixel 14E. In this case, α is the first sub-divided pixel 134 of the third sub-pixel 13E and the first sub-divided pixel 144 of the fourth sub-pixel 14E. The output of the pixel 10E corresponding to the area coverage modulation values of (0, 7, 7, 0) is an output obtained by using the first sub-divided pixel 114, the second sub-divided pixel 115, and the third sub-divided pixel 116 of the first sub-pixel 11E, the first sub-divided pixel 124, the second sub-divided pixel 125, and the third sub-divided pixel 126 of the second sub-pixel 12E, the second sub-divided pixel 135 of the third sub-pixel 13E, and the second sub-divided pixel 145 of the fourth sub-pixel 14E. In this case, β is the second sub-divided pixel 135 of the third sub-pixel 13E and the second sub-divided pixel 145 of the fourth sub-pixel 14E. In this manner, the sub-divided pixels of a sub-pixel 15 (e.g., third sub-pixel 13E and the fourth sub-pixel 14E) different from the certain sub-pixel 15 (e.g., first sub-pixel 11E and the second sub-pixel 12E) that are brought to a lighting state in the second pattern (e.g., pattern Gb) are sub-divided pixels (e.g., first sub-divided pixels 134 and 144, and second sub-divided pixels 135 and 145) that are smaller in size than at least the largest sub-divided pixel (e.g., third sub-divided pixels 116 and 126) out of the sub-divided pixels that are lit up of the certain sub-pixel 15. In the second pattern (e.g., pattern Gb), at least one of the sub-divided pixels (e.g., third sub-divided pixel 136 or 146) of the sub-pixel 15 different from the certain sub-pixel 15 does not operate.

Figure 15:
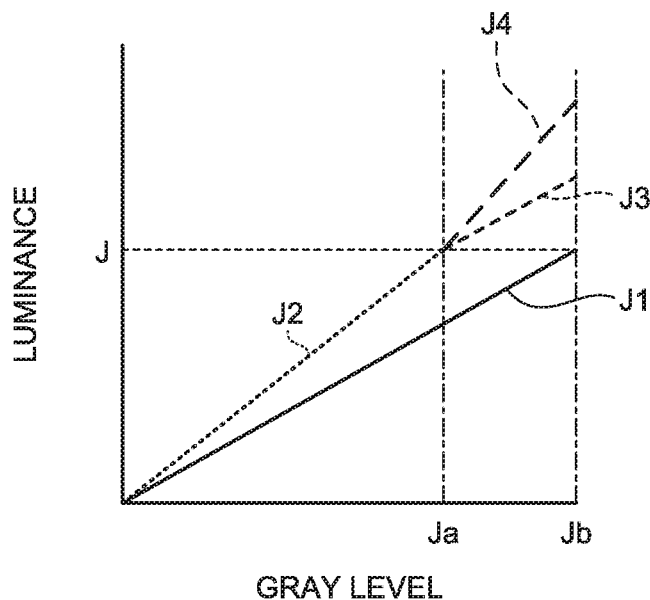
FIG. 15 is a graph illustrating a relation between color density (gray level) and luminance.

FIG. 15 is a graph illustrating a relation between color density (gray level) and luminance. Assume that a line J1 in FIG. 15 indicates a relation between density of green indicated by (R1, RG3, BG3, B1) and luminance when the values of (R1, RG3, BG3, B1) are converted to area coverage modulation values in the pattern Ga. On the other hand, luminance when the values of (R1, RG3, BG3, B1) are converted to area coverage modulation values in the pattern Gb is as indicated by a broken line J2. That is, the number of the sub-divided pixels in a display state is greater in the pattern Gb than that in the pattern Ga. Specifically, the area in the display state is larger in the pattern Gb than that in the pattern Ga, provided that the gradation value is the same in both patterns. This can increase the luminance with respect to the color density. As an example, the luminance of the pixel 10E obtained at the maximum density Jb in the pattern Ga is obtained at density (density Ja) lower than the maximum density Jb in the pattern Gb. For the output having density exceeding the density Ja, high luminance that cannot be obtained in the pattern Ga can be obtained in the pattern Gb, as indicated by a broken line J3 or a broken line J4, for example. This also means that the pattern Gb can obtain the luminance of the pixel 10E more easily than the pattern Ga even when the external light IL is weaker.

Figure 16:
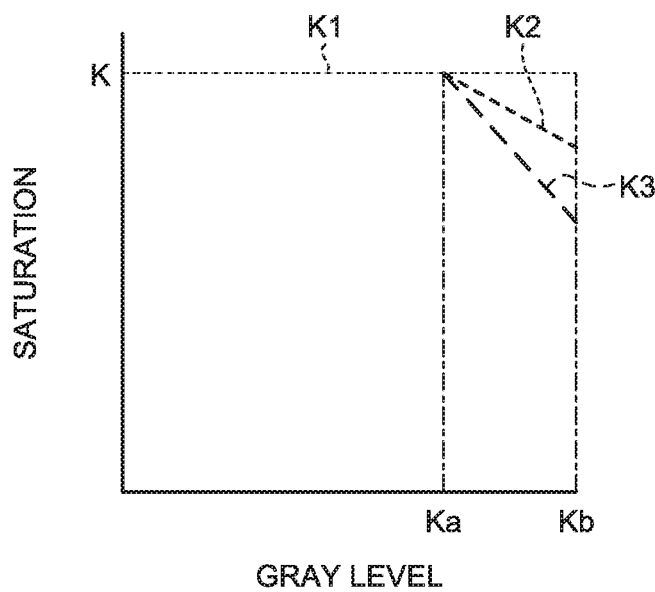
FIG. 16 is a graph illustrating a relation between the color density (gray level) and color saturation.

FIG. 16 is a graph illustrating a relation between the color density (gray level) and color saturation. For the reproduction of green, the pattern Ga uses the first sub-pixel 11E and the second sub-pixel 12E, but not the third sub-pixel 13E or the fourth sub-pixel 14E. Consequently, in the pattern Ga, color saturation remains constant regardless of the gradation value, i.e., the color density. Accordingly, when the pattern Ga is employed, the relation between the color density and the saturation is indicated by a broken line K1, for example. On the other hand, for the reproduction of green, the pattern Gb uses the first sub-pixel 11E and the second sub-pixel 12E, but not the third sub-pixel 13E or the fourth sub-pixel 14E, except a case of a partially high density output, such as the output corresponding to the gradation values of (R1, RG3, BG3, B1)=(0, 255, 255, 0). In the case of the partially high density output, the pattern Gb uses the third sub-pixel 13E and the fourth sub-pixel 14E, in addition to the first sub-pixel 11E and the second sub-pixel 12E to reproduce green. When density Ka to the maximum density Kb illustrated in FIG. 16 correspond to the partially high density output, the pattern Gb uses the third sub-pixel 13E and the fourth sub-pixel 14E to reproduce green so that a red component and a blue component are added. As a result, the color saturation is reduced according to the color density as indicated by a broken line K2 or a broken line K3.

As described above, the pattern Gb is assumed to be employed when higher luminance than that can be obtained in the pattern Ga even with decreased color saturation at the time of the high density output is desired. The pattern Ga is assumed to be employed to maintain the color saturation indicated by the gradation value before being subjected to conversion to the area coverage modulation value. In a reflective display device such as the display device in the embodiment, it may be preferable to maintain predetermined luminance even at the expense of color reproducibility in order to achieve a clear display state even with weak environmental light including external light. The embodiment enables a pattern (e.g., pattern Gb) that includes an increased number of sub-divided pixels in the display state. Consequently, the embodiment can maintain high luminance even though color reproducibility is slightly decreased. Like in the embodiment, the sub-divided pixels that are separately brought into the display state are the first sub-divided pixel 134 and the second sub-divided pixel 135 of the third sub-pixel 13E, and the first sub-divided pixel 144 and the second sub-divided pixel 145 of the fourth sub-pixel 14E, which are not supposed to be selected for display in an original display state (e.g., pattern Ga). These sub-divided pixels occupy a relatively smaller display area than the areas of the first and the second sub-pixels 11E and 12E that are originally brought into the display state. Consequently, even when these sub-divided pixels are brought into the display state in an auxiliary manner in order to secure luminance, a change in tinge is subtle.

The foregoing has described a plurality of patterns of area coverage modulation using the example of the reproduction of green with reference to FIGS. 12 to 16. A plurality of patterns of area coverage modulation may be set similarly to colors other than green.

Figure 17:
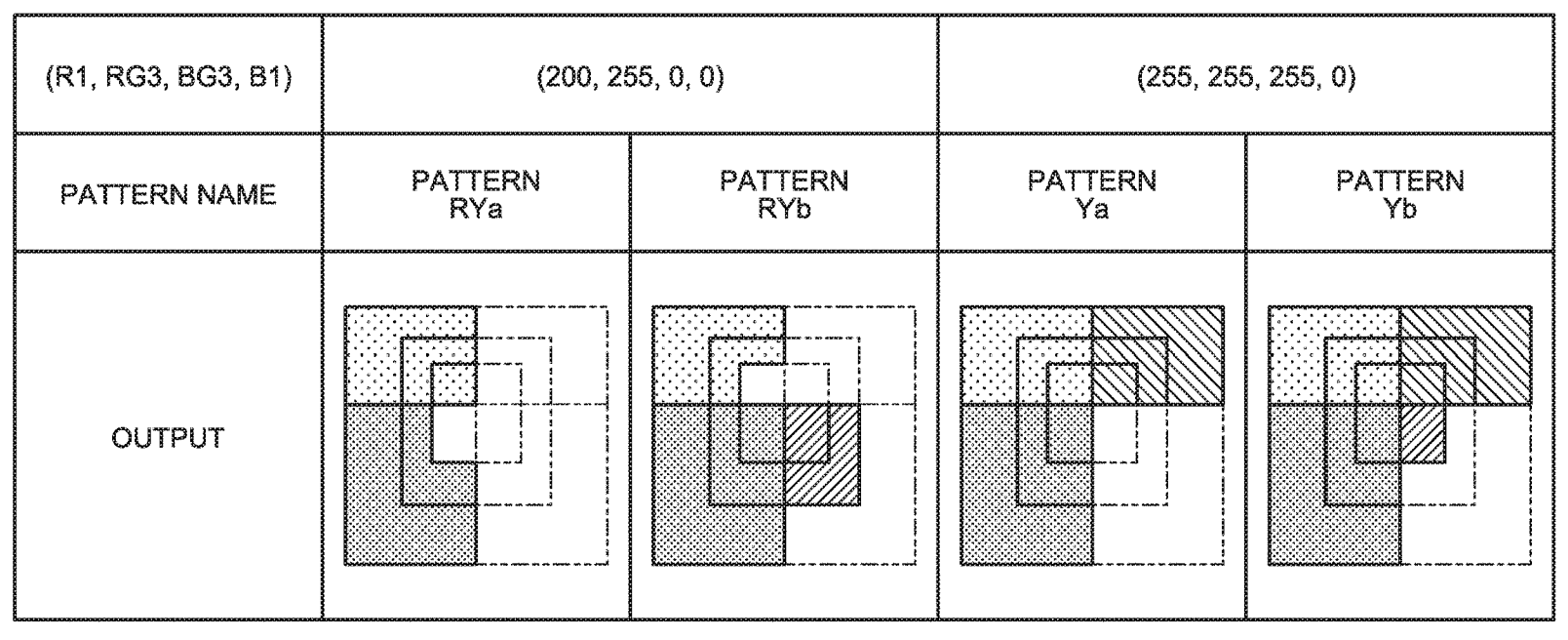

FIG. 17 is a diagram illustrating another example of area coverage modulation including a plurality of patterns. For example, a pattern RYa and a pattern RYb may be set for the output corresponding to the gradation values of (R1, RG3, BG3, B1)=(200, 255, 0, 0). The pattern RYa is similar to the pattern Ga in a correspondence between the area coverage modulation values and the 8-bit gradation values. The pattern RYb achieves a higher luminance output than the pattern RYa does. As a specific example, the gradation values to be converted to the area coverage modulation values of (6, 7, 0, 0) in the pattern RYa are converted to the area coverage modulation values of (6, 7, 0, 2) in the pattern RYb. A pattern Ya and a pattern Yb may be set for the output corresponding to the gradation values of (R1, RG3, BG3, B1)=(200, 255, 255, 0). The pattern Ya is similar to the pattern Ga in a correspondence between the area coverage modulation values and the 8-bit gradation values. The pattern Yb achieves a higher luminance output than the pattern Ya does. As a specific example, the gradation values to be converted to the area coverage modulation values of (7, 7, 7, 0) in the pattern Ya are converted to the area coverage modulation values of (7, 7, 7, 1) in the pattern Yb.

Figure 18:
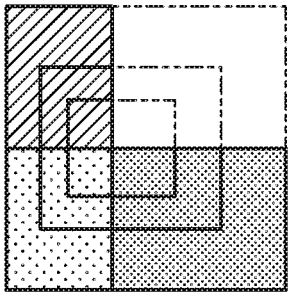
FIG. 18 is a diagram illustrating an example of area coverage modulation including three patterns.

FIG. 18 is a diagram illustrating an example of area coverage modulation including three patterns. The number of patterns of the area coverage modulation may be 3 or more. For example, as illustrated in FIG. 18, a total of three patterns, i.e., the pattern RYa, the pattern Ya, and the pattern Yb may be set as the patterns of area coverage modulation corresponding to certain gradation values (e.g., (R1, RG3, BG3, B1)=(200, 255, 0, 0)). In the case of employing the three patterns, when the relation between color density and luminance in the pattern RYa is represented as the line J1 in FIG. 15, the relation between the color density and luminance in the pattern Ya in which one sub-pixel of another color is added is represented as, for example, a combination of the broken lines J2 and J3; and the relation between the color density and luminance in the pattern Yb in which two sub-pixels of other colors are added is represented as, for example, a combination of the broken lines J2 and J4. In the case of employing the three patterns, when the relation between the color density and saturation in the pattern RYa is represented as the broken line K1 in FIG. 16, the relation between the color density and saturation in the pattern Ya in which one sub-pixel of another color is added is represented as, for example, the broken line K2 during the partially high density output; and the relation between the color density and saturation in the pattern Yb in which two sub-pixels of other colors are added is represented as, for example, the broken line K3 during the partially high density output. Among the abovementioned three patterns, the pattern RYa yields the highest saturation; the pattern Ya yields a middle level in saturation and brightness; and the pattern Yb yields the highest brightness.

In addition to the pattern Ga and the pattern Gb described with reference to FIG. 14, a pattern may be set in which the area coverage modulation values take the area coverage modulation values of the sub-pixels 15 obtained by adding 1 to the area coverage modulation values excluding 0 in the pattern Ga. In this pattern, the 8-bit gradation values to be converted to the area coverage modulation values of (0, 7, 7, 0) in the pattern Ga are converted to, for example, the area coverage modulation values of (1, 7, 7, 1).

When display luminance is low, contrast is typically required for high display luminance in order to ensure visibility. On the other hand, when display luminance is high, contrast is not so important. With high display luminance, color density changes the impression of an image. A reflective display device displays a brighter image as the intensity of external light, increases, and thus colors of a display image, in addition to the brightness and contrast, are important under a bright environment. As described with reference to FIGS. 13 to 17, the display device maintains color saturation with respect to color density excluding the time of the partially high density output, and prioritizes luminance at the time of the partially high density output, thereby balancing contrast required during the low luminance output and colors during the high luminance output.

A transmissive display device tends to have contrast reduced by, for example, reflection of light on the surface and inside of the display device in an outdoor environment where the screen is directly irradiated with external light having a high intensity. As a result, when the transmissive display device is viewed under the outdoor environment, colors of a display image may look lighter. On the other hand, the reflective display device of the embodiment allows the reflection factor of the light OL reflected by the reflective electrode 40 to be constant, thereby obtaining constant contrast. The reflective display device in the embodiment maintains contrast without being lowered even in the external light environment, thereby achieving high visibility. Meanwhile, the luminance of the display by the reflective display device depends on the intensity of the external light IL. In this configuration, for the purpose of obtaining luminance even with weak external light IL to make the image look brighter, the reflective display device can employ a pattern in which high luminance is easily obtained, such as the pattern Gb illustrated in FIGS. 13 and 14, for example. As a specific example, the reflective display device may employ a pattern prioritizing color saturation, such as the pattern Ga, during a time period when sufficient sunlight can be obtained, and may employ a pattern prioritizing luminance, such as the pattern Gb, during a time period such as nighttime when external light is relatively weak. This configuration allows the image to be viewed as a brighter image, thereby improving the impression of the image.

The area coverage modulation including a plurality of patterns has been described using the pixel 10E illustrated in FIG. 12 as an example. In any configuration including the pixel 10C illustrated in FIG. 10 and the pixel 10D illustrated in FIG. 11 in which the sub-pixels 15 each include a plurality of sub-divided pixels, the area coverage modulation including a plurality of patterns can be set in the same manner as the pixel 10E. The area coverage modulation including a plurality of patterns can be set not only in the case of N=3, but also in a case of N taking a value other than 3.

As described with reference to FIG. 4, all the sub-pixels are used to reproduce white. Consequently, for the reproduction of white, the embodiment cannot set a pattern in which a difference value from, the N-bit maximum area coverage modulation value (e.g., 7 when N=3) out of the area coverage modulation value of sub-pixels 15 is allocated to the area coverage modulation values of other sub-pixels 15 less than the maximum area coverage modulation value. The embodiment may employ a configuration in which such allocation is not made for the reproduction of white.

The following describes a detailed configuration of a display device 1 in the embodiment with reference to FIGS. 19 to 24. In the description with reference to FIGS. 19 to 24, one of the sub-divided pixels will be referred to as a "sub-divided pixel 50".

Figure 19:
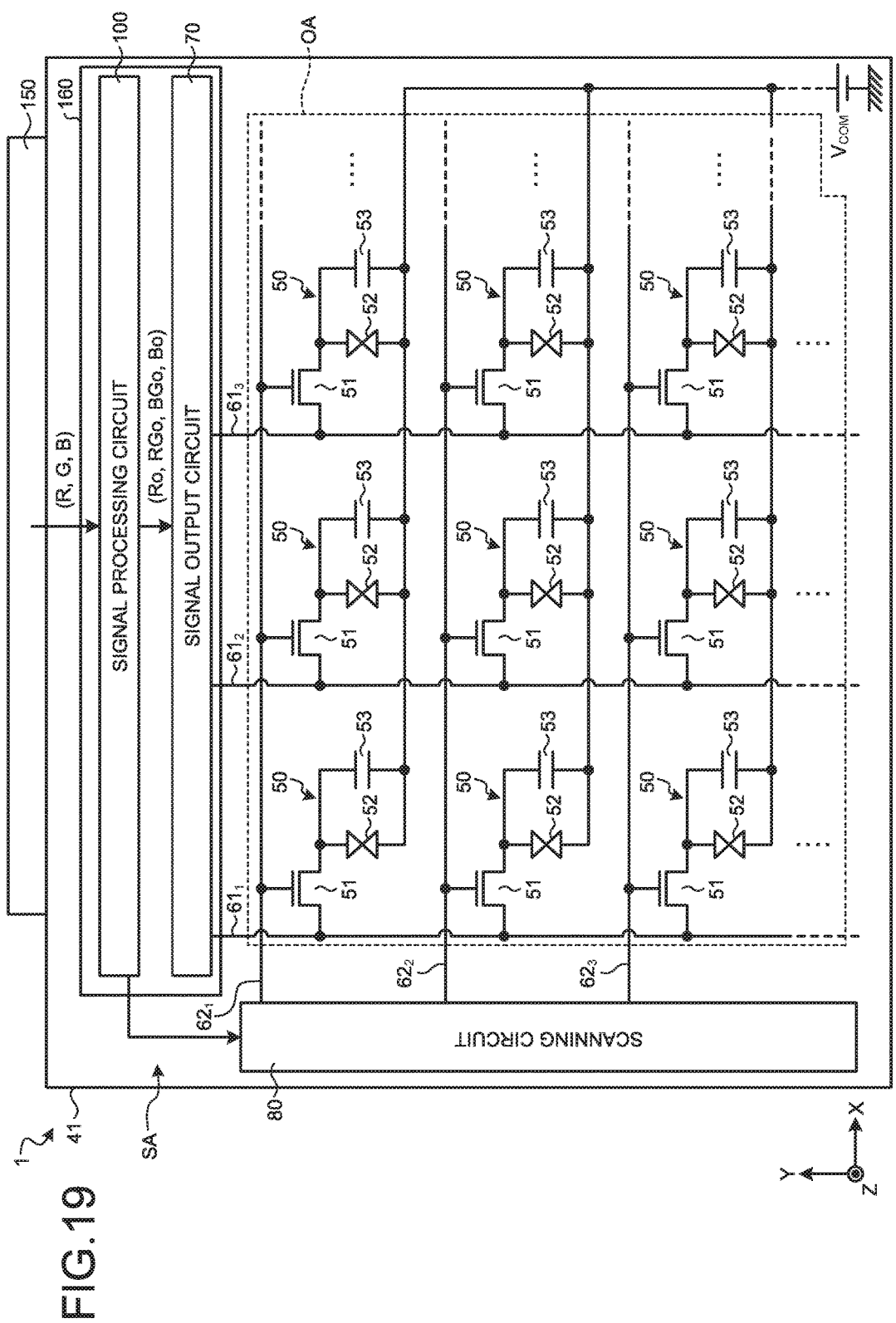
FIG. 19 is a diagram illustrating an exemplary circuit configuration of a display device in the embodiment.

FIG. 19 is a diagram illustrating an exemplary circuit configuration of the display device 1 in the embodiment. The X-direction in FIG. 19 indicates a row direction of the display device 1, and the Y-direction in FIG. 19 indicates a column direction of the display device 1. As illustrated in FIG. 19, the sub-divided pixel 50 includes, for example, a pixel transistor 51 employing a thin-film transistor (TFT), a liquid crystal capacitor 52, and a holding capacitor 53. The pixel transistor 51 has a gate electrode coupled with a scanning line 62 ($62_1$, $62_2$, $62_3$, . . . ) and a source electrode coupled with a signal line 61 ($61_1$, $61_2$, $61_3$, . . . ).

The liquid crystal capacitor 52 denotes a capacitance component of a liquid crystal material generated between the reflective electrode 40 provided for each sub-divided pixel 50 and a counter electrode 22 (see FIG. 20) facing some of or all of the reflective electrodes 40. The reflective electrode 40 is coupled with a drain electrode of the pixel transistor 51. A common potential $V_{COM}$ is applied to the counter electrode 22. The common potential $V_{COM}$ is inverted at predetermined cycles in order to inversely drive the sub-divided pixel 50 (see FIG. 22). The holding capacitor 53 has two electrodes. One of the electrodes has a potential identical to that of the reflective electrode 40 and the other of the electrodes has a potential identical to that of the counter electrode 22.

The pixel transistor 51 is coupled with the signal line 61 extending in the column direction and the scanning line 62 extending in the row direction. The sub-divided pixel 50 is at an intersection of the signal line 61 and the scanning line 62 in a display region OA. The signal lines 61 ($61_1$, $61_2$, $61_3$, . . . ) each have one end coupled with an output terminal corresponding to each column of a signal output circuit 70. The scanning lines 62 ($62_1$, $62_2$, $62_3$, . . . ) each have one end coupled with an output terminal corresponding to each row of a scanning circuit 80. The signal lines 61 ($61_1$, $61_2$, $61_3$, . . . ) each transmit a signal for driving the sub-divided pixels 50, i.e., a video signal output from the signal output circuit 70, to the sub-divided pixels 50, on a pixel column by pixel column basis. The scanning lines 62 ($62_1$, $62_2$, $62_3$, . . . ) each transmit a signal for selecting the sub-divided pixels 50 row by row, i.e., a scanning signal output from the scanning circuit 80, to each pixel row.

The signal output circuit 70 and the scanning circuit 80 are coupled with a signal processing circuit 100. The signal processing circuit 100 calculates a gradation value (R1, RG, BG, and B1 to be described later) of each of four sub-pixels 15 included in each pixel (e.g., pixel 10) according to the input gradation values of RGB. The signal processing circuit 100 outputs to the signal output circuit 70 a calculation result as area coverage modulation signals (Ro, RGo, BGo, and Bo) of each pixel. The signal output circuit 70 transmits to each sub-divided pixel 50 the video signal including the area coverage modulation signals (Ro, RGo, BGo, and Bo). The signal processing circuit 100 also outputs to the signal output circuit 70 and the scanning circuit 80 clock signals that synchronize operations of the signal output circuit 70 and the scanning circuit 80. The scanning circuit 80 scans the sub-divided pixels 50 in synchronism with the video signal from the signal output circuit 70. The embodiment may employ a configuration in which the signal output circuit 70 and the signal processing circuit 100 are included in a single IC chip 160, or a configuration in which the signal output circuit 70 and the signal processing circuit 100 are individual circuit chips. FIG. 12 illustrates circuit chips including the IC chip 160, in a peripheral region SA of a first substrate 41 using a Chip-On-Glass (COG) technique. This is merely one example of implementation of the circuit chips, and the present disclosure is not limited thereto. The circuit chips may be mounted on, for example, a flexible printed circuit (FPC) coupled with the first substrate 41, using a Chip-On-Film (COF) technique.

Figure 20:
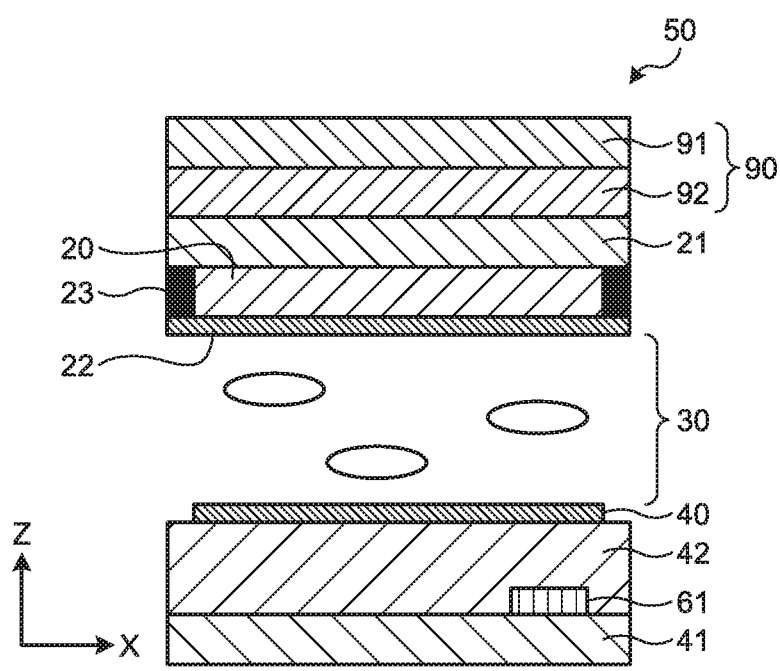
FIG. 20 is a sectional view schematically illustrating a sub-divided pixel.

FIG. 20 is a cross-sectional view schematically illustrating the sub-divided pixel 50. The reflective electrode 40 faces the counter electrode 22 with the liquid crystal layer 30 interposed therebetween. The reflective electrode 40 is provided to the first substrate 41. Specifically, wiring including the signal line 61, and an insulation layer 42 are stacked on a surface of the first substrate 41, the surface facing the liquid crystal layer 30. The insulation layer 42 insulates one wiring from another wiring and from electrodes. The reflective electrode 40 is a film-shaped electrode formed on a surface of the insulation layer 42. The counter electrode 22 and the color filter 20 are disposed on a second substrate 21. Specifically, the color filter 20 is disposed on a surface of the second substrate 21, the surface facing the liquid crystal layer 30. The black matrix 23 is disposed among the color filters 20. The counter electrode 22 is a film-shaped electrode formed on a surface of the color filter 20.

The sub-divided pixel 50 illustrated in FIG. 20 represents one of the sub-divided pixels provided for gradation expression by area coverage modulation described above with reference to FIGS. 10 and 11. Specifically, each of the sub-divided pixels 50 includes an individual reflective electrode 40. The reflective electrode 40 faces the counter electrode 22 with the liquid crystal layer 30 interposed therebetween.

The first substrate 41 and the second substrate 21 are, for example, glass substrates that transmit light. The counter electrode 22 transmits light and is formed of, for example, indium tin oxide (ITO). The reflective electrode 40 is a metal electrode that is formed of thin film silver (Ag), for example, and that reflects light.

The liquid crystal layer 30 is sealed with a sealing material, which is not illustrated. The sealing material seals the liquid crystal layer 30 by bonding the first substrate 41 and the second substrate 21 at their ends. A spacer, which is not illustrated, determines a distance between the reflective electrode 40 and the counter electrode 22. An initial orientation state of liquid crystal molecules of the liquid crystal layer 30 is determined by orientation films (not illustrated) provided to the respective first and second substrates 41 and 21. The liquid crystal molecules do not transmit light in the initial orientation state. The state of not transmitting light in the initial orientation state in which no electric field is applied to the liquid crystal layer 30 is referred to as normally black.

The spectrum of the light OL transmitted through the color filter 20 illustrated in FIG. 20 has a peak that falls on either one of the spectrum of reddish green, the spectrum of bluish green, the spectrum of red, and the spectrum of blue, as described with reference to FIGS. 3, 7, and 8.

As described above, the display device 1 includes: the first substrate 41 provided with the reflective electrode 40; the second substrate 21 provided with the color filter 20 and the translucent electrode (counter electrode 22); and the liquid crystal layer 30 disposed between the reflective electrode 40 and the translucent electrode. As described with reference to FIG. 1, the light modulation layer 90, for example, to modulate the scattering direction of the light OL emitted from the display device 1, may be provided to the second substrate 21 on the opposite side of the liquid crystal layer 30 with the color filter 20 interposed therebetween. The light modulation layer 90 includes, for example, a polarizing plate 91 and a scattering layer 92. The polarizing plate 91 faces a display surface. The scattering layer 92 is disposed between the polarizing plate 91 and the second substrate 21. The polarizing plate 91 prevents glare by transmitting beams of light polarized in a specific direction. The scattering layer 92 scatters the light OL reflected by the reflective electrode 40.

The display device 1 in the embodiment employs the sub-divided pixel 50 according to a memory-in-pixel (MIP) technology to have a memory function. According to the MIP technology, the sub-divided pixel 50 has a memory to store data, thereby allowing the display device 1 to perform display in a memory display mode. The memory display mode allows the gradation of the sub-divided pixel 50 to be digitally displayed based on binary information (logic "1" and logic "0") stored in the memory in the sub-divided pixel 50.

Figure 21:
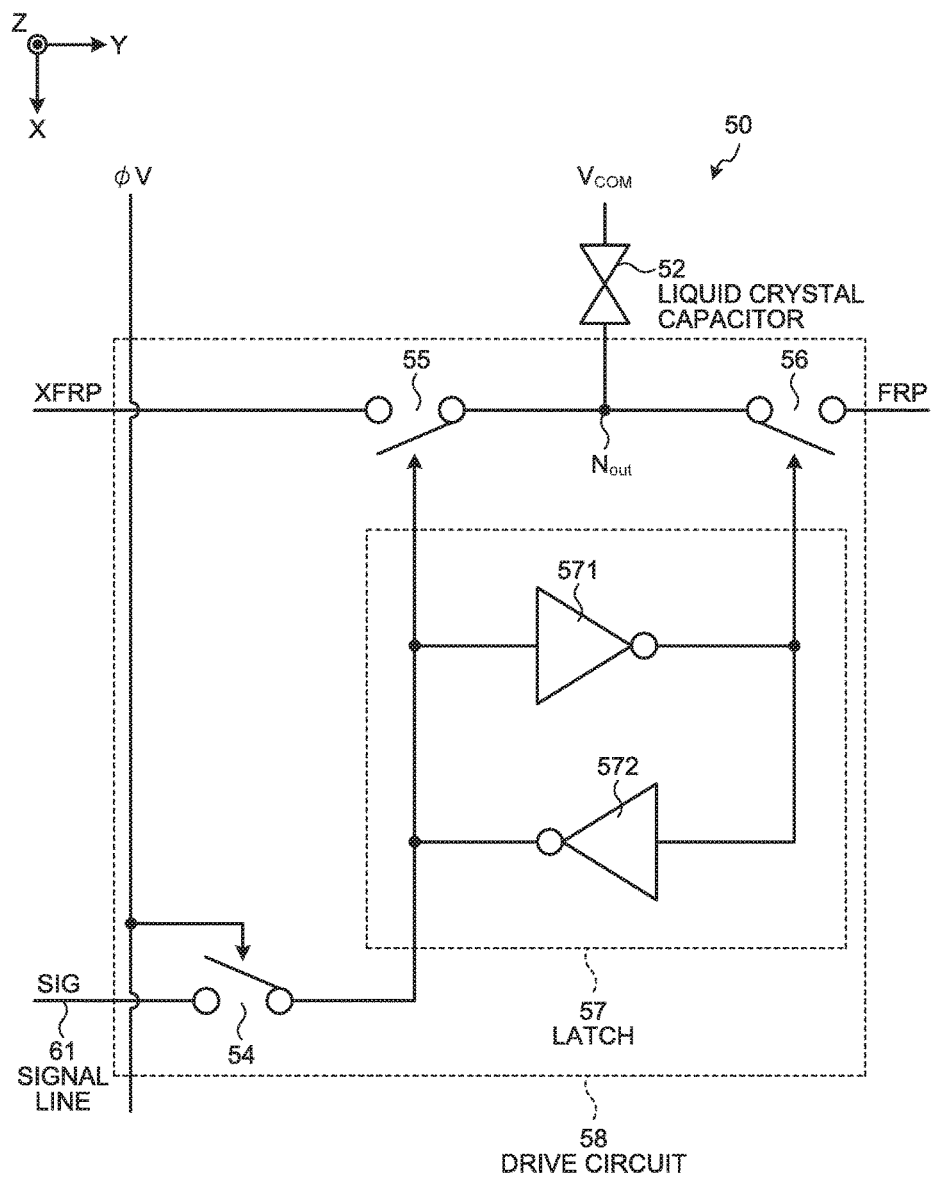
FIG. 21 is a block diagram illustrating an exemplary circuit configuration of the pixel employing a memory in pixel (MIP) technology.
Figure 22:
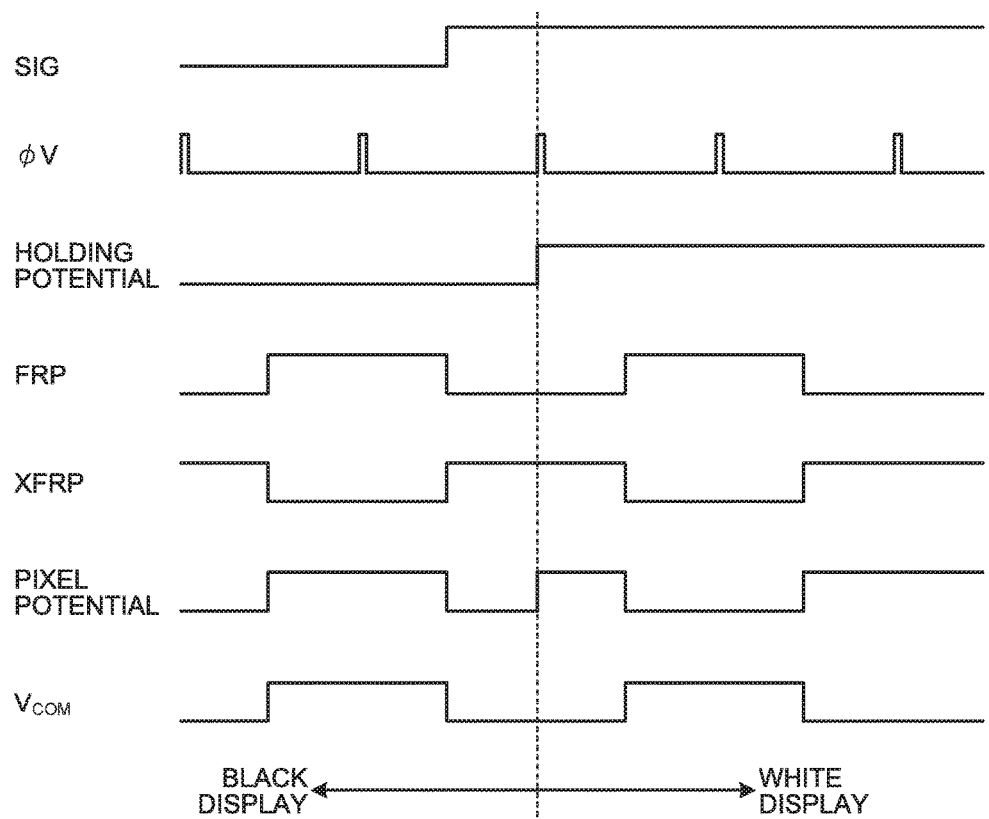
FIG. 22 is a timing chart for explaining an operation of the pixel employing the MIP technology.

FIG. 21 is a block diagram illustrating an exemplary circuit configuration of the sub-divided pixel 50 employing the MIP technology. FIG. 22 is a timing chart for explaining an operation of the sub-divided pixel 50 employing the MIP technology. As illustrated in FIG. 21, the sub-divided pixel 50 includes a drive circuit 58 in addition to the liquid crystal capacitor (liquid crystal cell) 52. The drive circuit 58 includes three switching devices 54, 55, and 56 and a latch 57. The drive circuit 58 has a static random access memory (SRAM) function. The sub-divided pixel 50 including the drive circuit 58 is configured to have the SRAM function.

The switching device 54 has one end coupled with the signal line 61. The switching device 54 is turned ON (closed) by a scanning signal φV applied from the scanning circuit 80, so that the drive circuit 58 obtains data SIG supplied from the signal output circuit 70 via the signal line 61. The latch 57 includes inverters 571 and 572. The inverters 571 and 572 are coupled in parallel with each other in directions opposite to each other. The latch 57 latches a potential corresponding to the data SIG obtained through the switching device 54.

A control pulse XFRP having a phase opposite to that of the common potential $V_{COM}$ is applied to one terminal of the switching device 55. A control pulse FRP having a phase identical to that of the common potential $V_{COM}$ is applied to one terminal of the switching device 56. The switching devices 55 and 56 each have the other terminal coupled with a common connection node. The common connection node serves as an output node $N_{out}$. Either one of the switching devices 55 and 56 is turned ON depending on a polarity of the holding potential of the latch 57. Through the foregoing operation, the control pulse FRP or the control pulse XFRP is applied to the reflective electrode 40 while the common potential $V_{COM}$ is being applied to the counter electrode 22 that generates the liquid crystal capacitor 52.

When the holding potential of the latch 57 has a negative polarity, the pixel potential of the liquid crystal capacitor 52 is in the same phase with that of the common potential $V_{COM}$, causing no potential difference between the reflective electrode 40 and the counter electrode 22. Thus, no electric field is generated in the liquid crystal layer 30. Consequently, the liquid crystal molecules are not twisted from the initial orientation state and the normally black state is maintained. As a result, light is not transmitted in this sub-divided pixel 50. On the other hand, when the holding potential of the latch 57 has a positive polarity, the pixel potential of the liquid crystal capacitor 52 is in an opposite phase of that of the common potential $V_{COM}$, causing a potential difference between the reflective electrode 40 and the counter electrode 22. An electric field then is generated in the liquid crystal layer 30. The electric field causes the liquid crystal molecules to be twisted from the initial orientation state and to change orientation thereof. Thus, light is transmitted in the sub-divided pixel 50 (light transmitted state). As described above, in the display device 1, the sub-divided pixels each include a holder (latch 57) that holds a potential variable according to gradation expression.

In each sub-divided pixel 50, the control pulse FRP or the control pulse XFRP is applied to the reflective electrode 40 generating the liquid crystal capacitor 52 when either one of the switching devices 55 and 56 is turned ON depending on the polarity of the holding potential of the latch 57. Transmission of light is thereby controlled for the sub-divided pixel 50.

The foregoing describes the example in which the sub-divided pixel 50 employs the SRAM as a memory incorporated in the sub-divided pixel 50. The SRAM is, however, illustrative only and the embodiment may employ other types of memory, for example, a dynamic random access memory (DRAM).

Figure 23:
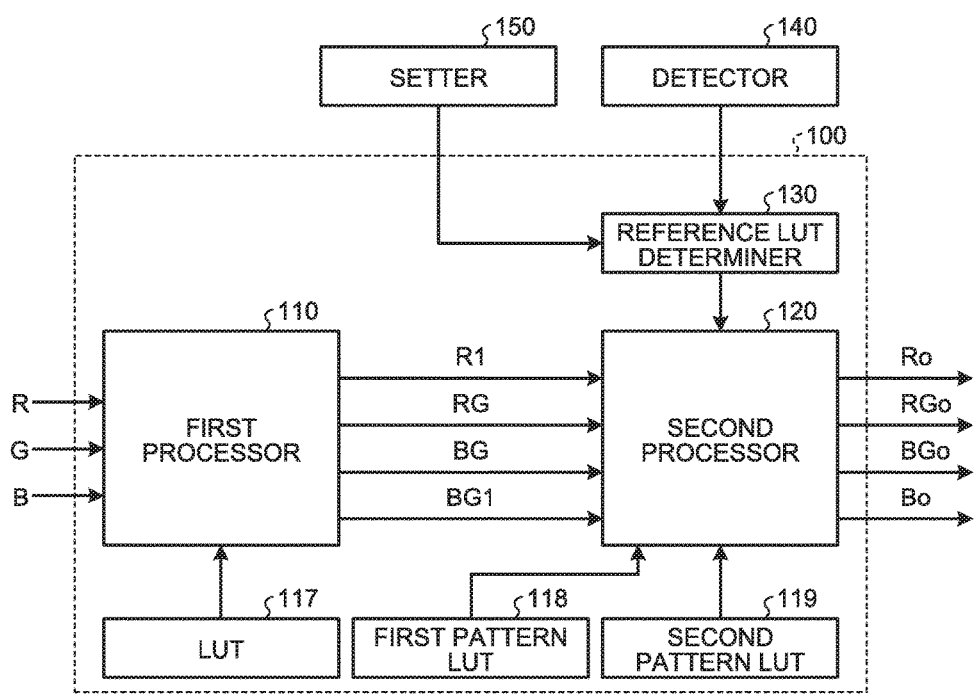
FIG. 23 is a block diagram illustrating an exemplary configuration of a signal processing circuit.

FIG. 23 is a block diagram illustrating an exemplary configuration of the signal processing circuit. The signal processing circuit 100 includes a first, processor 110, a second processor 120, a look-up table (LUT) 117, a first pattern LUT 118, a second pattern LUT 119, a reference LUT determiner 130, a detector 140, and a setter 150. The first processor 110 identifies the gradation values (R1, RG, BG, and B1) of the respective four sub-pixels 15 included in each pixel (e.g., pixel 10) according to the input gradation values of R, G, and B. The gradation value of "RG" out of the gradation values (R1, RG, BG, and B1) of the four respective sub-pixels 15 is the gradation value of any one of the first red green RG1, the second red green RG2, and the third red green RG3, for example. Specifically, "RG" corresponds to the peak of the spectrum of the light transmitted through the first color filter included in the first sub-pixel. The gradation value of "BG" is the gradation value of any one of the first blue green BG1, the second blue green BG2, and the third blue green BG3, for example. Specifically, "BG" corresponds to the peak of the spectrum of the light transmitted through the second color filter included in the second sub-pixel. The gradation value of "R1" is the gradation value of the red (R1), for example. Specifically, "R1" corresponds to the peak of the spectrum of the light transmitted through the third color filter included in the third sub-pixel. The gradation value of "B1" is the gradation value of the blue (B1), for example. Specifically, "B1" corresponds to the peak of the spectrum of the light transmitted through the fourth color filter included in the fourth sub-pixel.

The LUT 117 is table data including the information on the gradation values of the four respective sub-pixels 15 predetermined for the gradation values of R, G, and B. The following describes an example in which the LUT 117 determines the gradation value of each of the first sub-pixel 11, the second sub-pixel 12, the third sub-pixel 13, and the fourth sub-pixel 14 illustrated in FIG. 13 (or FIG. 14). The first processor 110 refers to the LUT 117 and identifies the gradation values of (R1, RG1, BG1, and B1) corresponding to the input gradation values of R, G, and B. For example, when the input gradation values of R, G, and B are expressed as (R, G, B)=(n, n, n) as illustrated in FIG. 4, the first processor 110 refers to the LUT 117 and identifies the gradation values as (R1, RG1, BG1, B1)=(n1, n2, n3, n4), where (n1, n2, n3, n4) represent colors of the first sub-pixel 11, the second sub-pixel 12, the third sub-pixel 13, and the fourth sub-pixel 14 and are gradation values for reproducing colors corresponding to (R, G, B)=(n, n, n). The same applies to a case in which the input gradation values of R, G, and B are other gradation values. When the input gradation values of R, G, and B are expressed as (R, G, B)=(n, 0, 0), the first processor 110 identifies the gradation values as (R1, RG1, BG1, B1)=(n, 0, 0, 0). When the input gradation values of R, G, and B are expressed as (R, G, B)=(0, n, 0), the first processor 110 identifies the gradation values as (R1, RG1, BG1, B1)=(0, n5, n6, 0). When the input gradation values of R, G, and B are expressed as (R, G, B)=(0, 0, n), the first processor 110 identifies the gradation values as (R1, RG1, BG1, B1)=(0, 0, 0, n). When the input gradation values of R, G, and B are expressed as (R, G, B)=(m, m, 0), the first processor 110 identifies the gradation values as (R1, RG1, BG1, B1)=(m1, m2, m3, 0). When the input gradation values of R, G, and B are expressed as (R, G, B)=(0, m, m), the first processor 110 identifies the gradation values as (R1, RG1, BG1, B1)=(0, m4, m5, m6). When the input gradation values of R, G, and B are expressed as (R, G, B)=(m, 0, m), the first processor 110 identifies the gradation values as (R1, RG1, BG1, B1)=(m7, 0, 0, m8).

The second processor 120 outputs to the signal output circuit 70 the area coverage modulation signals (Ro, RGo, BGo, and Bo) corresponding to the respective sub-divided pixels 50 associated with the gradation values (R1, RG, BG, and B1) (e.g., R1, RG1, BG1, and B1) of the respective four sub-pixels 15. For example, when the gradation values of the colors of (R1, RG1, BG1, and B1) identified by the first processor 110 are 8-bit numeric values (0 to 255), the second processor 120 converts the 8-bit numeric values into area coverage modulation values. In performing the conversion process, the second processor 120 refers to data corresponding to any one of the patterns of area coverage modulation. FIG. 23 exemplifies the first pattern LUT 118 and the second pattern LUT 119 as the data corresponding to the patterns of area coverage modulation. The first pattern LUT 118 and the second pattern LUT 119 correspond to different patterns of the area coverage modulation.

When N=3, for example, a correspondence between the N-bit gradation values (0 to 7) and the 8-bit gradation values (0 to 255) may be classified as follows: 0: 0 to 31; 1: 32 to 63; 2: 64 to 95; 3: 96 to 127; 4: 128 to 159; 5: 160 to 191; 6: 192 to 223; and 7: 224 to 255. The foregoing correspondence is similar to that of the pattern Ga described with reference to FIG. 13 and that of the pattern RYa and the pattern Ya described with reference to FIG. 17. The first pattern LUT 118 represents, for example, data according to the foregoing correspondence. The second pattern LUT 119 represents data of the patterns similar to the pattern Gb described with reference to FIG. 13 and the pattern RYb and the pattern Yb described with reference to FIG. 17. The second processor 120 refers to either one of the first pattern LUT 118 and the second pattern LUT 119 and converts the gradation values of the colors of (R1, RG1, BG1, and B1) into the corresponding area coverage modulation values. For example, the second processor 120 converts the gradation values of the colors of (R1, RG1, BG1, and B1) into the corresponding N-bit gradation values. For example, the second processor 120, when referring to the first pattern LUT 118, converts the gradation values of (R1, RG1, BG1, B1)=(0, 255, 255, 0) to signals corresponding to the area coverage modulation values of (Ro, RGo, BGo, Bo)=(0, 7, 7, 0), and outputs the signals to the signal output circuit 70. The second processor 120, when referring to the second pattern LUT 119, converts the gradation values of (R1, RG1, BG1, B1)=(0, 255, 255, 0) to signals corresponding to the area coverage modulation values of (Ro, RGo, BGo, Bo)=(2, 7, 7, 2), and outputs the signals to the signal output circuit 70.

The reference LUT determiner 130 determines data referred to by the second processor 120. Specifically, the reference LUT determiner 130 is a circuit that determines either one of the first pattern LUT 118 and the second pattern LUT 119 as the data referred to by the second processor 120 according to inputs from the detector 140 and the setter 150.

The detector 140 detects intensity of light. Specifically, the detector 140 is, for example, a luminance sensor provided to the display device 1. The detector 140 detects the intensity of the external light IL, for example, on the side of the display device 1 on which the light modulator 90 is disposed. The intensity of the external light IL detected by the detector 140 provides information for determining whether sufficient luminance can be obtained even when the first pattern LUT 118 is employed or whether the second pattern LUT 119 is to be employed in order to obtain even higher luminance.

The setter 150 sets conditions relating to the patterns of area coverage modulation. Specifically, the setter 150 sets conditions relating to data referred to by the second processor 120 according to, for example, an input operation performed from the outside via an input device of the display device 1, including a touch panel and keys. More specifically, the setter 150 sets the luminance of the external light IL to be determined to provide sufficient luminance, for example. The set luminance of the external light IL is held in the reference LUT determiner 130. The reference LUT determiner 130 compares the luminance of the external light IL held therein with the luminance of the external light IL detected by the detector 140 to determine whether sufficient luminance is obtained. When it is determined that the sufficient luminance is obtained, the reference LUT determiner 130 causes the second processor 120 to refer to the first pattern LUT 118. When it is determined that the sufficient luminance is not obtained, the reference LUT determiner 130 causes the second processor 120 to refer to the second pattern LUT 119. Consequently, the signal processing circuit 100 can control operations of the sub-divided pixels through the use of any one of the patterns of area coverage modulation based on the predetermined conditions including the intensity of light. The setter 150 may be configured to enable manual setting of information on the intensity of light in an environment in which the display device 1 is used in preference to detection results by the detector 140. In this case, the reference LUT determiner 130 determines the data referred to by the second processor 120 based on information on the intensity of light set by the setter 150.

The first pattern LUT 118 and the second pattern LUT 119 represent data corresponding to the respective patterns of area coverage modulation when the number of patterns of area coverage modulation is two. When the number of patterns of area coverage modulation is three or more, three or more sets of data are provided for the respective patterns of area coverage modulation.

Figure 24:
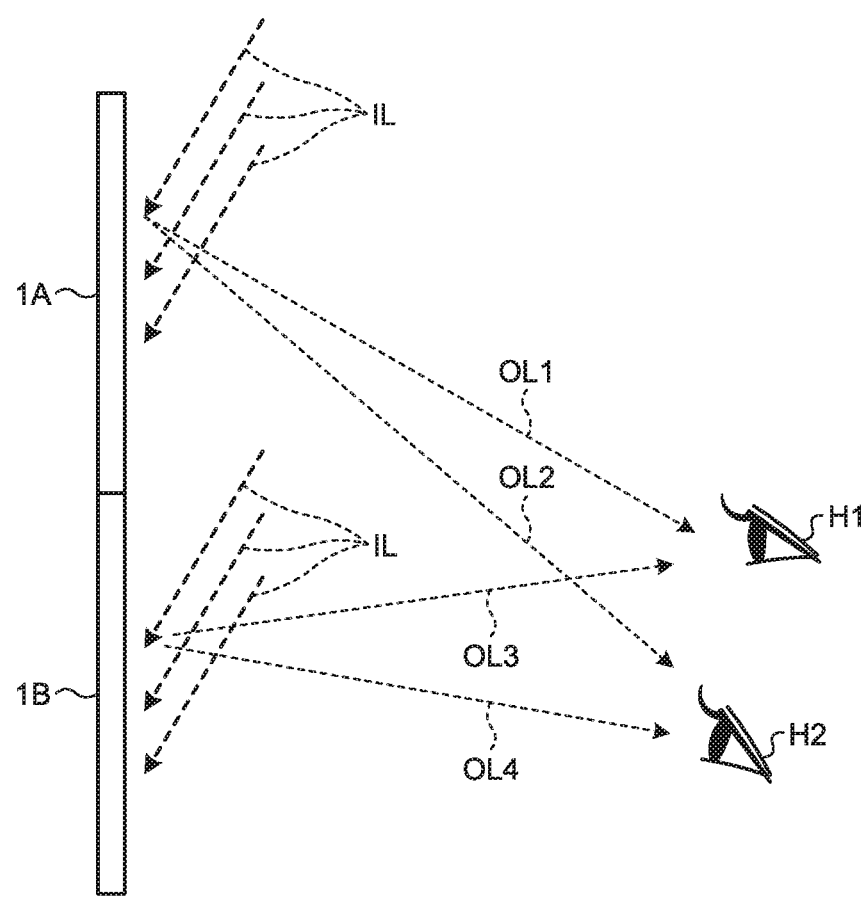
FIG. 24 is a diagram schematically illustrating an exemplary relation among external light, reflected light, and user's viewpoints when a plurality of display devices are disposed in juxtaposition.

FIG. 24 is a diagram schematically illustrating an exemplary relation among the external light IL, reflected light OL1, OL2, OL3, and OL4, and user's viewpoints H1 and H2 when a plurality of display devices 1A and 1B are disposed in juxtaposition. Each of the display devices 1A and 1B is the display device in the embodiment (e.g., display device 1). The reflected light OL1, OL2, OL3, and OL4 represent beams of light OL having exit angles different from each other. As illustrated in FIG. 24, when the display devices 1A and 1B are disposed in juxtaposition, for example, beams of light OL having different exit angles from the display devices 1A and 1B may be viewed even with an incident angle of incident light IL on the display device 1A being identical to an incident angle of incident light IL on the display device 1B. In this case, with respect to the user's viewpoint H1, the reflected light OL from the display device 1A is the reflected light OL1, and the reflected light OL from the display device 1B is the reflected light OL3. Which of the reflected light OL1 or the reflected light OL2 from the display device 1A is viewed by the user is changed depending on which of the user's viewpoint H1 or the user's view point H2 is assumed. Similarly, which of the reflected light OL3 or the reflected light OL4 from the display device 1B is viewed by the user is changed depending on which of the user's viewpoint H1 or the user's view point H2 is assumed. Consequently, the exit angle of the light OL viewed by the user may vary depending on conditions, such as how the display devices 1A and 1B are disposed, and where the user's viewpoint is. Thus, the display device 1A may be configured differently from the display device 1B without departing from the scope of the present disclosure. For example, either one of the display devices 1A and 1B may employ the area ratio of the four sub-pixels 15 as illustrated in any one of FIGS. 3, 7, and 8, and the other of the display devices 1A and 1B may employ the area ratio of the four sub-pixels 15 as illustrated in the other one of FIGS. 3, 7, and 8. Alternatively, the correspondence between the input (gradation values of R, G, and B) and (R1, RG, BG, and B1) in the LUT 117 of the display device 1A may be made different from the correspondence between the input (gradation values of R, G, and B) and (R1, RG, BG, and B1) in the LUT 117 of the display device 1B.

As described above, in the reflective display device in the embodiment, the third sub-pixel and the fourth sub-pixel are each greater in size than the first sub-pixel and the second sub-pixel. The first sub-pixel added to the second sub-pixel has a size equal to or greater than the size of the third sub-pixel and has a size equal to or greater than the size of the fourth sub-pixel. The first sub-pixel includes the first color filter that has a spectrum peak falling on the spectrum of reddish green. The second sub-pixel includes the second color filter that has a spectrum peak falling on the spectrum of bluish green. The third sub-pixel includes the third color filter that has a spectrum peak falling on the spectrum of red. The fourth sub-pixel includes the fourth color filter that has a spectrum peak falling on the spectrum of blue. The foregoing arrangement can further increase the luminance and saturation of yellow, thereby achieving the required luminance and saturation of yellow (e.g., yellow Y). Having a plurality of patterns of combinations of whether each of the sub-divided pixels transmits light can balance contrast required during the low luminance output and colors during the high luminance output.

In the embodiment, the detector 140 detects light intensity, so that combinations of whether each of the sub-divided pixels reflects light according to the intensity of light obtained by the display device can be employed.

The setter 150 enables even more flexible use of combinations of whether each of the sub-divided pixels reflects light according to the intensity of light.

Making the fourth sub-pixel greater in size than the third sub-pixel allows the hue of the spectrum of light transmitted through the color filters included in the first sub-pixel and the second sub-pixel to be more on the positive side. This configuration allows the light transmission efficiency of the color filters included in the first sub-pixel and the second sub-pixel to be more easily increased. Accordingly, the configuration further increases the luminance and saturation of yellow, thereby reliably achieving the required luminance and saturation of yellow (e.g., yellow Y).

Making the second sub-pixel greater in size than the first sub-pixel allows the hue of the spectrum of light transmitted through the color filter included in the first sub-pixel to be more on the positive side. This configuration allows the light transmission efficiency of the color filter included in the first sub-pixel to be more easily increased. Accordingly, the configuration further increases the luminance and saturation of yellow, thereby reliably achieving the required luminance and saturation of yellow (e.g., yellow Y).

The first sub-pixel, the second sub-pixel, and the third sub-pixel in combination reproduce yellow. This configuration can allocate a greater area of color filters and reflective electrodes combining the first sub-pixel, the second sub-pixel, and the third sub-pixel out of the display region of a single pixel to the reproduction of yellow. Consequently, the configuration can reliably achieve the required luminance and saturation of yellow (e.g., yellow Y).

The first sub-pixel and the second sub-pixel in combination reproduce green. This configuration can allocate a greater area of color filters and reflective electrodes combining the first sub-pixel and the second sub-pixel out of the display region of a single pixel to the reproduction of green.

The first sub-pixel is adjacent to the second sub-pixel. This arrangement allows green to be reproduced more uniformly.

A display device operable with lower power consumption can be provided by the sub-divided pixels performing the area coverage modulation The sub-divided pixels each include a holder that holds a potential variable according to gradation expression. This configuration allows the display device to further reduce power consumption.

The present disclosure can naturally provide other advantageous effects that are provided by the aspects described in the embodiments above and are clearly defined by the description in the present specification or appropriately conceivable by those skilled in the art.

What is claimed is:

1. A display device comprising:
   a controller; and
   a pixel including:
   a first sub-pixel including a first color filter configured to transmit light having a spectrum peak falling on a spectrum of reddish green;
   a second sub-pixel including a second color filter configured to transmit light having a spectrum peak falling on a spectrum of bluish green;
   a third sub-pixel including a third color filter configured to transmit light having a spectrum peak falling on a spectrum of red; and
   a fourth sub-pixel including a fourth color filter configured to transmit light having a spectrum peak falling on a spectrum of blue, wherein
   the first sub-pixel, the second sub-pixel, the third sub-pixel, and the fourth sub-pixel each include a reflective electrode configured to reflect light transmitted through the corresponding color filter,
   each of the third sub-pixel and the fourth sub-pixel is greater in size than the first sub-pixel and the second sub-pixel,
   the first sub-pixel added to the second sub-pixel has a size equal to or greater than a size of the third sub-pixel,
   the first sub-pixel, the second sub-pixel, the third sub-pixel, and the fourth sub-pixel are each divided into a plurality of sub-divided pixels having different areas so as to perform multiple gradation expression through a combination of whether each of the sub-divided pixels reflects light, and
   the controller is configured to store a plurality of patterns of combinations of whether each of the sub-divided pixels reflects light according to an input signal, and control operations of the sub-divided pixels through use of any one of the patterns based on a predetermined condition including intensity of the light.

2. The display device according to claim 1, wherein the first sub-pixel added to the second sub-pixel has the size equal to or greater than a size of the fourth sub-pixel.

3. The display device according to claim 1, further comprising a detector configured to detect the intensity of the light.

4. The display device according to claim 1, further comprising a setter configured to set the predetermined condition.

5. The display device according to claim 1, wherein the fourth sub-pixel is greater in size than the third sub-pixel.

6. The display device according to claim 5, wherein the second sub-pixel is greater in size than the first sub-pixel.

7. The display device according to claim 1, wherein the first sub-pixel, the second sub-pixel, and the third sub-pixel in combination reproduce yellow.

8. The display device according to claim 1, wherein the first sub-pixel and the second sub-pixel in combination reproduce green.

9. The display device according to claim 1, wherein the first sub-pixel is adjacent to the second sub-pixel.

10. The display device according to claim 1, further comprising:
    a first substrate provided with the reflective electrode;
    a second substrate provided with the color filter and a translucent electrode; and
    a liquid crystal layer disposed between the reflective electrode and the translucent electrode,
    wherein each of the sub-divided pixels included in the sub-pixels has a holder configured to hold a potential variable according to the gradation expression.

11. The display device according to claim 1, wherein the patterns stored in the controller include:
    a first pattern configured to, when a pixel signal setting sub-divided pixels of a certain sub-pixel into a maximum gradation state is received, supply the certain sub-pixel with an output signal that brings all the sub-divided pixels of the certain sub-pixel to a lighting state; and
    a second pattern configured to, when a pixel signal setting sub-divided pixels of a certain sub-pixel into the maximum gradation state is received, supply the certain sub-pixel with an output signal that brings all the sub-divided pixels of the certain sub-pixel to the lighting state, and supply a sub-pixel different from the certain sub-pixel with an output signal that brings any one of the sub-divided pixels of the sub-pixel different from the certain sub-pixel to the lighting state.

12. The display device according to claim 11, wherein the sub-divided pixel brought to the lighting state in the sub-pixel different from the certain sub-pixel in the second pattern is smaller in size than at least a sub-divided pixel having the largest size among the sub-divided pixels that are all lit up in the certain sub-pixel.

13. The display device according to claim 11, wherein an area of a region brought to the lighting state of the sub-pixel different from the certain sub-pixel in the second pattern is smaller than at least an area of a region in a full-lighting state of the certain sub-pixel.

14. The display device according to claim 11, wherein in a pixel brought to the lighting state in the second pattern, at least one of centers of luminance in an X-direction and a Y-direction is inoperative, as compared with a pixel brought to the lighting state in the first pattern.

* * * * *